(12) United States Patent
Altmaier et al.

(10) Patent No.: US 8,732,236 B2
(45) Date of Patent: May 20, 2014

(54) MANAGING NETWORK COMMUNICATIONS BETWEEN NETWORK NODES AND STREAM TRANSPORT PROTOCOL

(75) Inventors: Joseph Altmaier, North Liberty, IA (US); Robert J. Butler, Coralville, IA (US); David Van Wie, Eugene, OR (US)

(73) Assignee: Social Communications Company, Santa Clara, CA (US)

( * ) Notice: Subject to any disclaimer, the term of this patent is extended or adjusted under 35 U.S.C. 154(b) by 582 days.

(21) Appl. No.: 12/825,512

(22) Filed: Jun. 29, 2010

(65) Prior Publication Data

US 2010/0274848 A1     Oct. 28, 2010

Related U.S. Application Data

(63) Continuation-in-part of application No. 12/630,973, filed on Dec. 4, 2009, now Pat. No. 8,578,000.

(60) Provisional application No. 61/120,372, filed on Dec. 5, 2008, provisional application No. 61/318,156, filed on Mar. 26, 2010.

(51) Int. Cl.
   *G06F 15/16* (2006.01)

(52) U.S. Cl.
   USPC ........... 709/203; 709/220; 709/224; 709/228; 709/218; 370/338; 370/352

(58) Field of Classification Search
   USPC .......... 709/203, 220, 224, 228, 218; 370/338, 370/352
   See application file for complete search history.

(56) References Cited

U.S. PATENT DOCUMENTS

| | | |
|---|---|---|
| 5,193,151 A | 3/1993 | Jain |
| 5,297,262 A | 3/1994 | Cox et al. |
| 5,434,913 A | 7/1995 | Tung et al. |
| 5,721,922 A | 2/1998 | Dingwall |
| 5,832,309 A | 11/1998 | Noe et al. |
| 5,903,752 A | 5/1999 | Dingwall et al. |
| 5,913,038 A | 6/1999 | Griffiths |

(Continued)

FOREIGN PATENT DOCUMENTS

| | | |
|---|---|---|
| JP | 2008182670 | 8/2006 |
| KR | 10-2009-0016692 | 2/2009 |

(Continued)

OTHER PUBLICATIONS

Search report and written opinion in counterpart PCT Application No. PCT/US2011/029723, dated Nov. 30, 2011.

(Continued)

*Primary Examiner* — Quang N Nguyen
*Assistant Examiner* — Benjamin M Thieu
(74) *Attorney, Agent, or Firm* — Edouard Garcia

(57) ABSTRACT

A stream transport protocol supports realtime network communications between communicants operating on respective network nodes. The stream transport protocol supports remote management of client communication sessions, including provisioning of each pair of client network nodes with a respective session definition defining a respective peer-to-peer session over a network connection between the constituent client network nodes of the pair. The stream transport protocol has relatively low computational resource requirements so that realtime communications performance can be achieved using a wide range of computing devices and network connections that currently are available.

50 Claims, 16 Drawing Sheets

(56) References Cited

U.S. PATENT DOCUMENTS

| | | |
|---|---|---|
| 5,960,173 A | 9/1999 | Tang et al. |
| 5,991,402 A | 11/1999 | Jia et al. |
| 5,991,836 A | 11/1999 | Renda |
| 5,995,745 A | 11/1999 | Yodaiken |
| 6,006,279 A | 12/1999 | Hayes |
| 6,016,515 A | 1/2000 | Shaw et al. |
| 6,076,114 A | 6/2000 | Wesley |
| 6,092,095 A | 7/2000 | Maytal |
| 6,141,686 A | 10/2000 | Jackowski et al. |
| 6,148,336 A | 11/2000 | Thomas et al. |
| 6,182,125 B1 | 1/2001 | Borella |
| 6,216,173 B1 | 4/2001 | Jones et al. |
| 6,219,706 B1 | 4/2001 | Fan |
| 6,243,753 B1 | 6/2001 | Machin et al. |
| 6,260,057 B1 | 7/2001 | Eykholt et al. |
| 6,273,622 B1 | 8/2001 | Ben-David |
| 6,324,564 B1 | 11/2001 | Thielke |
| 6,343,263 B1 | 1/2002 | Nichols et al. |
| 6,349,344 B1 | 2/2002 | Sauntry et al. |
| 6,405,255 B1 | 6/2002 | Stoltz et al. |
| 6,438,603 B1 | 8/2002 | Ogus |
| 6,466,962 B2 | 10/2002 | Bollella |
| 6,470,397 B1 | 10/2002 | Shah et al. |
| 1,615,973 A1 | 11/2002 | Ben-Yehezkel |
| 6,490,611 B1 | 12/2002 | Shen et al. |
| 6,549,538 B1 | 4/2003 | Beck |
| 6,587,875 B1 | 7/2003 | Ogus |
| 6,615,278 B1 | 9/2003 | Curtis |
| 6,646,195 B1 | 11/2003 | Puryear |
| 6,708,210 B2 | 3/2004 | Chang et al. |
| 6,742,176 B1 | 5/2004 | Million et al. |
| 6,763,176 B1 | 7/2004 | Trottier et al. |
| 6,771,594 B1 | 8/2004 | Upadrasta |
| 6,779,027 B1 | 8/2004 | Schunicht et al. |
| 6,782,424 B2 | 8/2004 | Yodaiken |
| 6,807,667 B1 | 10/2004 | Bar et al. |
| 6,862,735 B1 | 3/2005 | Slaughter et al. |
| 6,871,345 B1 | 3/2005 | Crow et al. |
| 6,918,093 B2 | 7/2005 | Broussard |
| 6,961,631 B1 | 11/2005 | Puryear |
| 6,961,942 B1 | 11/2005 | Adermann et al. |
| 6,974,901 B2 | 12/2005 | Puryear |
| 6,990,669 B1 | 1/2006 | Ballantyne |
| 6,996,832 B2 | 2/2006 | Gunduc et al. |
| 7,017,162 B2 | 3/2006 | Smith et al. |
| 7,065,553 B1 | 6/2006 | Chesley et al. |
| 7,069,590 B1 | 6/2006 | Malvar et al. |
| 7,140,015 B1 | 11/2006 | Bhanjois et al. |
| 7,149,314 B2 | 12/2006 | Dahl et al. |
| 7,159,222 B1 | 1/2007 | Forin et al. |
| 7,171,669 B2 | 1/2007 | Jones et al. |
| 7,197,017 B1 | 3/2007 | Rezaiifar |
| 7,206,809 B2 | 4/2007 | Ludwig et al. |
| 7,213,054 B2 | 5/2007 | Evans et al. |
| 7,254,610 B1 | 8/2007 | Turner et al. |
| 7,254,814 B1 | 8/2007 | Cormier et al. |
| 7,263,550 B1 | 8/2007 | Peiffer |
| 7,283,881 B2 | 10/2007 | Puryear |
| 7,296,226 B2 | 11/2007 | Junkermann |
| 7,305,679 B2 | 12/2007 | Kovacs et al. |
| 7,313,593 B1 | 12/2007 | Pulito et al. |
| 7,321,851 B2 | 1/2008 | Andrsen et al. |
| 7,386,356 B2 | 6/2008 | Fay et al. |
| 2001/0044904 A1 | 11/2001 | Berg et al. |
| 2002/0080822 A1 | 6/2002 | Brown et al. |
| 2002/0133248 A1 | 9/2002 | Fay et al. |
| 2002/0180787 A1 | 12/2002 | Broussard |
| 2003/0067887 A1 | 4/2003 | Truetken |
| 2004/0003139 A1 | 1/2004 | Cottrille et al. |
| 2004/0064210 A1 | 4/2004 | Puryear et al. |
| 2004/0088704 A1 | 5/2004 | Owen et al. |
| 2004/0143669 A1 | 7/2004 | Zhao |
| 2005/0060137 A1 | 3/2005 | Lanus et al. |
| 2005/0144608 A1 | 6/2005 | Oyama et al. |
| 2006/0168114 A1 | 7/2006 | Glatron et al. |
| 2006/0244818 A1 | 11/2006 | Majors et al. |
| 2006/0253539 A1 | 11/2006 | Casperson |
| 2006/0287747 A1 | 12/2006 | Fay et al. |
| 2007/0038701 A1 | 2/2007 | Majors et al. |
| 2007/0043804 A1 | 2/2007 | Fibaek |
| 2007/0044086 A1 | 2/2007 | Sampath |
| 2007/0073739 A1 | 3/2007 | Jennings et al. |
| 2007/0087735 A1 | 4/2007 | March et al. |
| 2007/0156407 A1 | 7/2007 | Schedl |
| 2007/0192818 A1 | 8/2007 | Bourges-Sevenier et al. |
| 2007/0198726 A1 | 8/2007 | Marco |
| 2007/0214461 A1 | 9/2007 | Glatron et al. |
| 2007/0240134 A1 | 10/2007 | Buragohain et al. |
| 2007/0250540 A1 | 10/2007 | Hsu |
| 2007/0274540 A1 | 11/2007 | Hagen et al. |
| 2007/0280206 A1 | 12/2007 | Messer et al. |
| 2008/0002698 A1 | 1/2008 | Pantalone |
| 2008/0005721 A1 | 1/2008 | Harvey et al. |
| 2008/0046893 A1 | 2/2008 | Taylor et al. |
| 2008/0055399 A1 | 3/2008 | Woodworth |
| 2008/0069011 A1 | 3/2008 | Sekaran et al. |
| 2008/0085502 A1 | 4/2008 | Allen et al. |
| 2008/0086548 A1 | 4/2008 | Chen et al. |
| 2008/0098121 A1 | 4/2008 | Wu |
| 2008/0232256 A1 | 9/2008 | Douglas |
| 2008/0242327 A1 | 10/2008 | Gabriel |
| 2009/0075642 A1* | 3/2009 | Rantapuska et al. ........ 455/422.1 |
| 2009/0265456 A1 | 10/2009 | Bouvier |
| 2009/0303906 A1 | 12/2009 | Zechlin |
| 2009/0319672 A1* | 12/2009 | Reisman ........................ 709/227 |
| 2010/0217837 A1* | 8/2010 | Ansari et al. .................. 709/218 |
| 2010/0293237 A1 | 11/2010 | Kramarz-Von-Kohout |
| 2011/0149864 A1 | 6/2011 | Lazaridis |
| 2011/0228699 A1 | 9/2011 | Shin |

FOREIGN PATENT DOCUMENTS

| | | |
|---|---|---|
| WO | 03/056859 A2 | 7/2003 |
| WO | 03073830 | 9/2003 |
| WO | 2006/084503 A1 | 8/2006 |
| WO | 2006127429 | 11/2006 |
| WO | WO2007/149338 | 12/2007 |
| WO | WO 2007149338 A2 * | 12/2007 |

OTHER PUBLICATIONS

Gregory Bollella et al., Support for Real-Time Computing Within General Purpose Operating Systems—Supporting Co-Resident Operating Systems, Proceedings of the Real-Time Technology and Applicarions Symposium, May 15-17, 1995, p. 4, IEEE Computer Society, Washington, D.C., USA.

C. Bouras et al., An Integrated Platform for Educational Virtual Environments, Web-based Intelligent E-Learning Systems: Technologies and Applications, 2006, pp. 291-320, Information Science Publishing, Hershey, Pennsylvania, USA.

Plug-Ins. Core Foundation>Process Management, Mar. 3, 2005, Apple Computer, Inc. Cupertino, CA, USA.

Armando Fox et al., Cluster-Based Scalable Network Services, ACM SIGOPS Operating Systems Review, Dec. 1997, pp. 78-91, vol. 31, ACM, New York, NY, USA.

Core Audio Overview Audio>Core Audio, Jan. 8, 2007, Apple Inc., Cupertino, CA, USA.

Pavel Curtis et al., MUDs Grow Up: Social Virtual Reality in the Real World, Proceedings of the 3rd International Conference of Cyberspace, Jan. 19, 1993, Xerox Palo Alto Research Center, Palo Alto, CA, USA.

DirectShow Brief Description, Feb. 23, 2006, Microsoft Corporation, Redmond, WA, USA.

Kai-Uwe Matzel et al., Contributing to Eclipse: Understanding and Writing Plug-Ins, eclipseCON 2005 Tutorial, Feb. 28-Mar. 3, 2005, Burlingame,CA, USA.

Chapter 1 Understanding Software Architecture, http://www.ug.it.usyd.edu.au/~iango/home/ESA-Chapter-1.pdf, (before Dec. 5, 2007).

Donald Tanguay et al., Nizza: A Framework for Developing Real-time Streaming Multimedia Applications, Aug. 2004, Hewlett-Packard Laboratories Technical Report, HPL-2004-132, Palo Alto, CA, USA.

(56) References Cited

OTHER PUBLICATIONS

Ivan Ganev et al., Kernel Plugins: When VM is Too Much, Proceedings of the 3rd Virtual Machine Research and Technology Symposium, May 2004, San Jose, CA, USA.

Yann Lejas, Global IP Solutions (GIPS) VoiceEngine Embedded Solutions on Analog Devices' Blackfin Platform, http://www.analog.com/zh/embedded-processing-dsp/content/blackfinis_gips_wp/fca.htlm, (before Dec. 5, 2007).

Kartik Gopalan, Real-Time Support in General Purpose Operating Systems, ECSL Technical Report TR92, Jan. 2001, Experimental Computer Systems Lab, Computer Science Department, Stony Brook University, Stony Brook, NY, USA.

Kevin Jeffay et al., Kernel Support for Live Digital Audio and Video, Computer Communications, Jul. 1992, pp. 388-395, vol. 15, Butterworth-Heinemann, Newton, MA, USA.

Jiantao Kong et al, KStreams: Kemal Support for Efficient End-to-End Data Streaming, Technical Report GIT—CERCS-04-04, 2004. College of Computing, Georgia Institute of Technology, Alanta, Georgia, USA.

Edward A. Lee et al., Dataflow Process Networks, Proceedings of the IEEE, May 1995, pp. 773-799, vol. 83., IEEE Press, Piscataway, NJ, USA.

Robert Chatley et al., MagicBeans: a Platform for Deploying Plugin Components, Proceedings of the Second International Working Conference on Component Deployment, May 2004, pp. 97-112, vol. 3083 of LNCS, Springer-Verlag, Edinburgh, UK.

Ossi Kauranen, Architecture for a Session Initiation Protocol Based Presence Client, Master's Thesis, Nov. 21, 2001, Department of Information Technology, Lappeenranta University of Technology, Lappeenranta, Finland.

OpenAL 1.1 Specification and Reference, Jun. 2005, http://connect.creativelabs.com/openal/Documentation/OpenAL%201.1%20Specification.pdf based on Version 1,0 Jun. 2000 published by Loki Software.

Developing Plug-ins and Applications, Adobe Acrobat SDK Version 8.1. Apr. 2007, Edition 2.0. Adobe Systems Incorporated, San Jose, CA, USA.

J. Rosenberg et al., STUN-Simple Traversal of User Datagram Protocol (UDP) Through Network Address Translators (NATs), RFC 3489, Mar. 2003, The Internet Society, Internet Engineering Task Force, Fremont, CA, USA.

K. Ghosh et al., A Survey of Real-Time Operating Systems, Technical Report GIT-CC-93/16, Feb. 1994. Georgia Institute of Technology, Atlanta, GA, USA.

M. Cherepov et al., Hard Real-Time with Venturcom RTX on Microsoft Windows XP and Windows XP Embedded, Windows XP Embedded Technical Articles, MSDN Library, Sep. 2003, Microsoft Corporabon, Redmond, WA, USA.

Klara Nahrstedt et al., A Service Kernel for Multimedia Endstations, Lecture Notes in Computer Science, Proceedings of the Second International Workshop on Multimedia: Advanced Teleservices and High-Speed Communication Architectures, 1994, pp. 8-12, vol. 868, Springer-Verlag, London. UK.

Aleksandar Simeonov et al., Advanced 3D Audio Algortms by a Flexible, Low Level Application Programming Interface, Proceedings of the 116th Audio Engineering Society Convention, May 8-11, 2004, Berlin, Germany.

David Maltz et al., TCP Splicing for Application Layer Proxy Performance, IBM Research Report RC-21139, Mar. 17, 1998, IBM Research Division, Almaden, CA, USA.

Reinhard Wolfinger et al., A Component Plug-in Architecture for the .NET Platform, Lectures Notes in Computer Science, vol. 4228, Proceedings of 7th Joint Modular Languages Conference, JMLC 2006, Sep. 13-15, 2006, Oxford, UK.

\* cited by examiner

| SODA ID 16 Bytes | SODA Length 2 Bytes | ActiveTimeout 4 Bytes | IdleTimeout 4 Bytes | SendWidowSize 2 Bytes | ReceivWindowSize 2 Bytes |
|---|---|---|---|---|---|

| SODA ID 16 Bytes | SODA Length 2 Bytes | Channel ID 16 Bytes | PacketNumMax 2 Bytes | PacketNumMissed 2 Bytes | PacketNumMissed 2 Bytes |
|---|---|---|---|---|---|

MANAGING NETWORK COMMUNICATIONS BETWEEN NETWORK NODES AND STREAM TRANSPORT PROTOCOL

CROSS-REFERENCE TO RELATED APPLICATIONS

Under 35 U.S.C. §119(e), this application claims the benefit of U.S. Provisional Application No. 61/318,156, filed Mar. 26, 2010, the entirety of which is incorporated herein by reference.

This application also is a continuation-in-part of prior U.S. patent application Ser. No. 12/630,973, filed Dec. 4, 2009, which claims the benefit of U.S. Provisional Application No. 61/120,372, filed Dec. 5, 2008. The entirety of prior U.S. patent application Ser. No. 12/630,973, filed Dec. 4, 2009, is incorporated herein by reference.

This application also relates to the following co-pending patent applications, the entirety of each of which is incorporated herein by reference: U.S. patent application Ser. No. 11/923,629, filed Oct. 24, 2007; U.S. patent application Ser. No. 11/923,634, filed Oct. 24, 2007; and U.S. patent application Ser. No. 12/509,658, filed Jul. 27, 2009.

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in virtual spaces.

A successful communications system typically should have relatively low computational resource requirements so that realtime communications performance can be achieved using currently available computing devices and network bandwidth constraints. In addition, such a system typically should be implemented in a way that achieves high connectability between a variety of difference devices across diverse network topologies and provides appropriate control over the transports of streams to the communicating devices so that a desired communications experience can be achieved.

DESCRIPTION OF DRAWINGS

FIG. 15 shows an exemplary embodiment of a Keepalive definition record.

FIG. 16 shows an exemplary embodiment of a Keepalive acknowledgement definition record.

DETAILED DESCRIPTION

Figure 1:
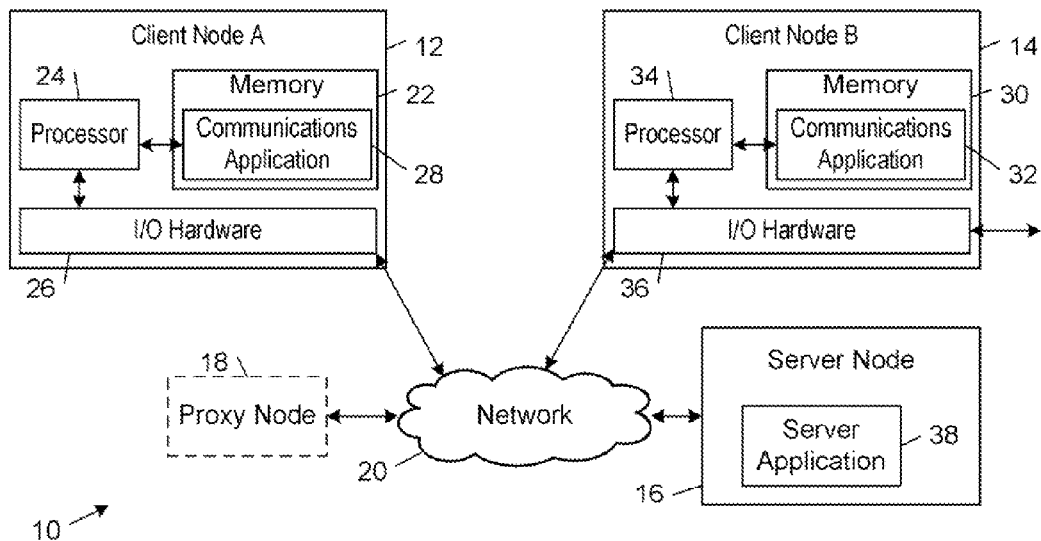
FIG. 1 is a diagrammatic view of an exemplary embodiment of a network communications environment that includes a first client network node, a second client network node, and a server node.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "computer data file" is a block of information that durably stores data for use by a software application.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to as a "node") is a junction or connection point in a communications network. Exemplary network nodes include, but are not limited to, a terminal, a computer, and a network switch. A "server" network node is a host computer on a network that responds to requests for information or service. A "client network node" is a computer on a network that requests information or service from a server. The term "local network node" refers to a network node that currently is the primary subject of discussion. The term "remote network node" refers to a network node that is connected to a local network node by a network communications link.

A "network address" is protocol-specific coded representation of a source or destination of a message and is used to uniquely identify a network node on a network.

A "socket" is a network communications endpoint. An application program typically can create a socket for communicating over a network by calling a network services application programming interface (API) of the operating system hosting the application program.

A "protocol port" (or simply "port") is an application-specific or process-specific software construct serving as a communications endpoint within a network node. A transport protocol assigns unique numbers to ports in order to distinguish among different endpoints within a network node.

A "network connection" (or simply "connection") is a data communications path between two network nodes. From the perspective of a given network node, a "transport stream" (or simply "stream") is a direct connection between the given network node and another network node.

A "session" is a logical connection between two endpoint network nodes (referred to herein as "session partners") that provides a context for exchanging messages between the two network nodes from the time the session is established to the time that is it torn down. From the perspective of a given network node, a session is transported on a transport stream, where the transport stream may or may not be addressed to the session partner. For example, a transport stream may be addressed to a proxy server that bridges the session to the session partner. A "peer-to-peer" (P2P) session is a session between two network nodes each of which can initiate the P2P session and act as a client and a server during the P2P session.

A "universally unique identifier" (also referred to as a "globally unique identifier," or GUID) is a number that is used to uniquely identify an object in a computer system or on a network (e.g., the internet). A universally unique identifier is generated without requiring a centralized service or authority to administer. A universally unique identifier typically is an octet string of 16 octets (128 bits). Depending on the specific mechanism used to generate a universally unique identifier, the universally unique identifier either is guaranteed to be different or is at least extremely likely to be different from any other universally unique identifier. A "well-known UUID" is a UUID that is used to reliably identify persistent objects across a network.

Synchronous conferencing refers to communications in which communicants participate at the same time. Synchronous conferencing encompasses all types of networked collaboration technologies, including instant messaging (e.g., text chat), audio conferencing, video conferencing, application sharing, and file sharing technologies.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual area communications application" is a client communications application that integrates realtime audio communications (and potentially other realtime communications, e.g., video, chat, and realtime other data stream) with visual presentations of interactions in a virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

In the context of a virtual area, an "object" (also sometimes referred to as a "prop") is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" (also referred to herein as a "sprite") is an object that represents a communicant in a virtual area.

As used herein, the term "includes" means includes but not limited to, the term "including" means including but not limited to. The term "based on" means based at least in part on.

II. INTRODUCTION

The embodiments that are described herein provide a stream transport protocol that supports realtime network communications between communicants operating on respective network nodes. The stream transport protocol has relatively low computational resource requirements so that realtime communications performance can be achieved using a wide range of computing devices and network connections that currently are available.

In some embodiments, the stream transport protocol supports remote management of client communication sessions and remote configuration and execution of audio and graphic rendering engines, as well as switching of data streams in response to instructions (also referred to as definitions) that are received from a remotely hosted server application. In this way, the stream transport protocol enables application developers to maintain control over the presentation of their communication environments on remote client network nodes, thereby encouraging the development of a wide variety of different types of virtual areas and increasing the number of users who will want to adopt the communications system.

The stream transport protocol is efficient in connection and disconnection, as well as in transport. In some embodiments, the stream transport protocol provides a connection-oriented, encrypted connection over a transport protocol (e.g., UDP, TCP, HTTP, and PPP). The stream transport protocol additionally provides between a client application and the transport layer a reconnection mechanism that automatically attempts to reestablish failed connections without intervention by the client application, thereby adding reliability on top of an inherently unreliable communication protocol.

III. OVERVIEW

FIG. 1 shows an embodiment of an exemplary network communications environment 10 that includes a first client network node 12 (Client Node A), a second client network node 14 (Client Network Node B), a server node 16, and an optional proxy node 18 that are interconnected by a network 20. The first client network node 12 includes a tangible computer-readable memory 22, a processor 24, and input/output (I/O) hardware 26 (including a display). The processor 24 executes at least one communications application 28 that is stored in the memory 22. The second client network node 14 typically is configured in substantially the same general way as the first client network node 12, with a tangible computer-readable memory 30 storing at least one communications application 32, a processor 34, and input/output (I/O) hardware 36 (including a display). The server node 16 typically is a synchronous conferencing server node that supports one or more types of communications between the client nodes 12, 14 (e.g., instant messaging (e.g., text chat), audio conferencing, video conferencing, application sharing, and file sharing).

The communications applications 28, 32 and the server node 16 together provide a platform (referred to herein as "the platform") for managing communications between communicants operating on the network nodes 12, 14 in accordance with a stream transport protocol that supports remote management of client communication sessions, remote configuration and execution of stream processing engines, and remote controlled switching of realtime data streams as specified by a server application 38 that is hosted by the server node 16. The network 20 may include any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, and video) between network nodes.

Figure 2:
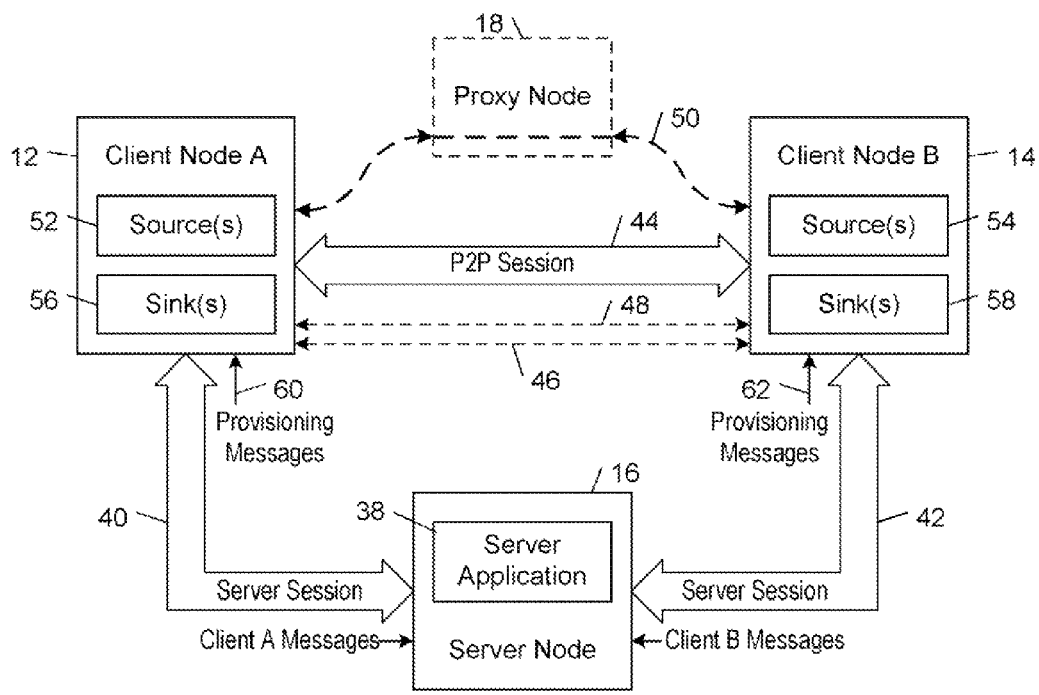
FIG. 2 is a diagrammatic view of an exemplary embodiment of the network communications environment of FIG. 1 that shows an exemplary set of network connections and sessions between the network nodes.

FIG. 2 shows an exemplary set of sessions that may be established between the client nodes 12, 14 and the server node 16. In this example, each of the client nodes 12, 14 establishes a respective server session 40, 42 with the server node 16. Each of the server sessions 40, 42 is established over a respective network connection between a respective one of the client nodes 12, 14 and the server node 16. In addition, each of the client nodes 12, 14 also establishes a peer-to-peer (P2P) session 44 over a network connection between the client nodes 12, 14. The client nodes 12, 14 also may establish and keep alive one or more alternate (or backup) connections 46, 48, 50 that may be used as failover connections for reestablishing a P2P session between the client nodes 12, 14 in the event that the original P2P session fails. In the illustrated example, the alternate network connection 50 is established through the proxy node 18, which simply relays messages (including session negotiation messages) between the client nodes 12, 14.

Each of the network nodes 12, 14 has a respective set 52, 54 of one or more sources and an exemplary set 56, 58 of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

Each source has an active state in which the source is available for originating data and an inactive state in which the source is not available for originating data. Likewise, each sink has an active state in which the sink is available for receiving data and an inactive state in which the sink is not available for receiving data. The states of the sources and sinks typically can be controlled by the communicants operating the client nodes 12, 14 via controls provided by the communications applications 28, 32. For example, in some embodiments, the communications applications 28, 32 provide user controls for turning on/off the local microphones and the local speakers (e.g., headsets) on the client network nodes 12, 14.

As explained in detail below, in the server sessions 40, 42, the server node 16 sends to each of the client nodes 12, 14 provisioning messages 60, 62 that configure the client nodes 12, 14 to interconnect respective data streams between active ones of their complementary sources and sinks in accordance with switching rules specified in the server application 38. By enabling a server application developer to control how the connections are established between the sources and sinks on different client nodes, the platform enables the application developer to control the experiences of the communicants as they communicate and otherwise interact with each other in the network communications environment 10. In this way, the server application developers are able to optimize the communications between the communicants for particular communication purposes or for particular communication environments (e.g., a virtual chat room, a virtual art gallery, a virtual concert hall, a virtual auditorium, a virtual conference room, and a virtual club house).

IV. EXAMPLES OF SYSTEMS AND METHODS EMBODYING THE STREAM TRANSPORT COMMUNICATIONS PROTOCOL

A. Introduction

Figure 3:
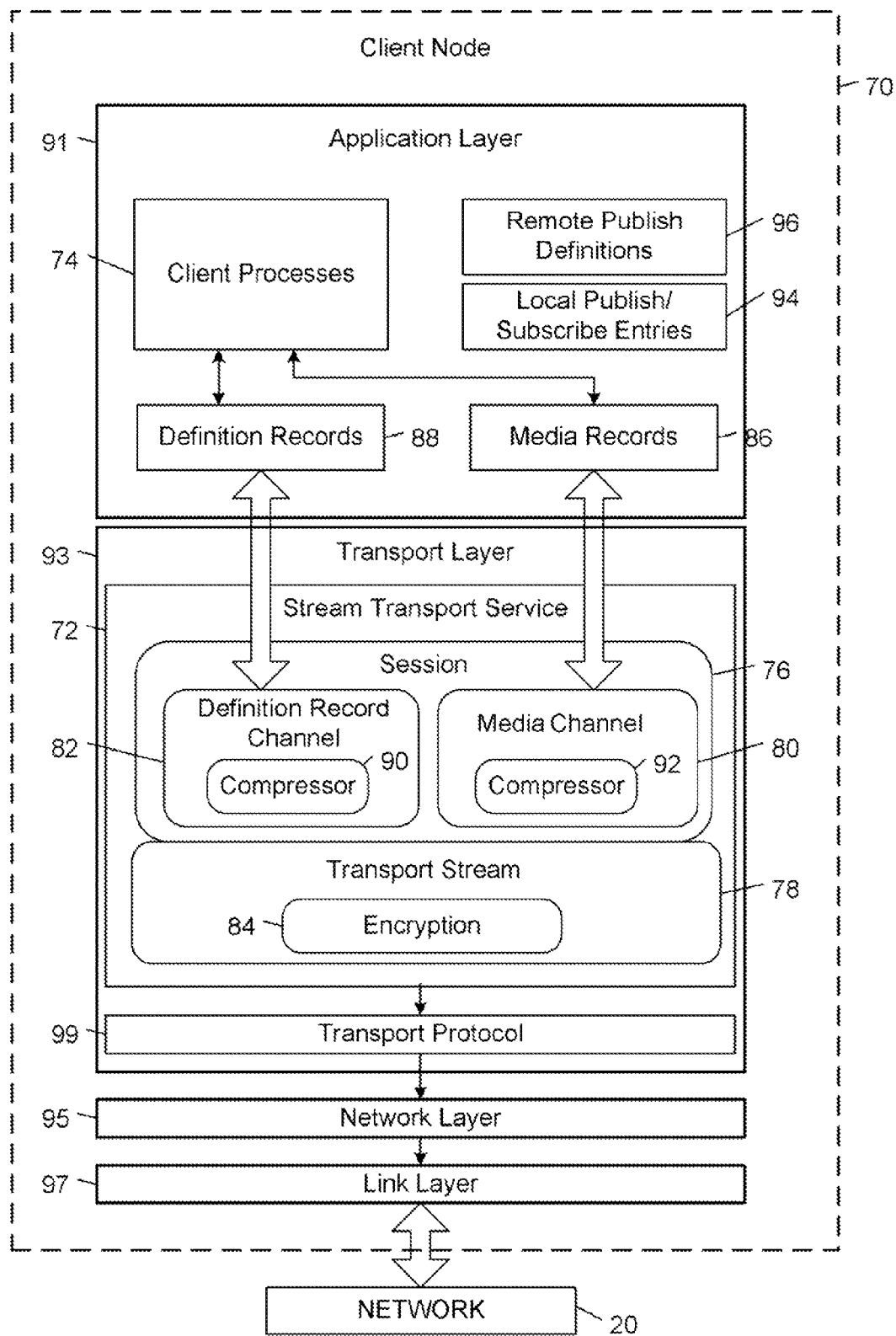
FIG. 3 is a diagrammatic view of an exemplary embodiment of a client network node.

FIG. 3 shows an exemplary embodiment 70 of one or both of the client nodes 12, 14 that includes a stream transport service 72 and other client processes 74 that, together, constitute a thin client communications application for rendering a communication environment in accordance with instructions that are received from the server node 16. The stream transport service 72 and the other client processes 74 operate at different levels—from network features through audio and graphics rendering configuration. The stream transport service 72 manages sessions between the client network node 70 and other network nodes. In this process, the stream transport service 72 typically provides a local API that exports channels and sessions to the client processes 74 in the application layer and a remote API for communicating in a server session with communications services operating on the server network node 16.

In some embodiments, the communications applications 28, 32 on the client nodes 12, 14 typically include respective graphical user interface (GUI) applications that provide a visual interface for visualizing and controlling communicant interactions. These GUI applications are configured to communicate with the server application 38 through the local stream transport service API. In some embodiments, the GUI application is a remote-controlled terminal application that is configured to pass user inputs (e.g., computer mouse inputs) to the respective ones of client processes 74 implementing the local API and to render graphical data (e.g., chat data and graphical content, such as screen share data) received from these client processes 74. These client processes 74 implementing the local API communicate with the stream transport service 72 in order to publish messages containing definitions of user inputs on the appropriate sessions and channels and to subscribe to data received from remote network nodes on the appropriate sessions and channels. In addition, one or more of the client processes 74 are remotely configured by instructions received from the communications services on the server network node 16 to create (and tear down) data processing component graphs for processing inbound data received from other client network nodes. For example, some embodiments include a remotely configurable audio processing service of a realtime kernel that creates and tears down graphs of audio processing components in response to definitions received from the communications services on the server network node 16. Additional details regarding an exemplary realtime kernel that includes remotely configurable processing components are provided in U.S. application Ser. No. 12/630,973, filed Dec. 4, 2009.

During a session, data is shared between the client network node 70 and other network nodes as definition records over transport protocol sockets. The thin client architecture receives configuration instructions from the server node 16 through definition records that are received over the server session. The thin client architecture also receives content from other client network nodes through definition records that are received on content-specific channels on respective sessions with the other client network nodes. Data is shared in accordance with a publish/subscribe model. The stream transport service 72 subscribes only to the data that are needed by the client network node 70. To subscribe, the stream transport service 72 negotiates a channel on a session that is established with another network node. The channel is negotiated by well-known GUID for the particular server application 38. Definition records are transmitted only when a subscriber exists on the other end of a transport protocol socket. Definition records that are received by the stream transport service 72 are delivered to the subscribing ones of the client processes 74 on arrival.

As shown in FIG. 3, the stream transport service 72 manages a session 76 on a transport stream 78. In some embodiments, a transport stream in the context of a stream transport protocol session is defined by a pair of {IP, port} addresses and a transport GUID, which identifies a transport protocol (e.g., UDP) that is used to create the stream. A session 76 consists of zero or more logical channels, where a channel is a sequence of definition records that are appropriate for a particular client process 74 (e.g., a graphics engine, an audio manager, and a stream switching manager). Thus, the same transport stream 78 on a single socket can transport definition records on different channels, each of which can be subscribed to by zero, one, or multiple of the client processes 74. In the illustrated embodiment, the stream transport service 72 manages two kinds of channels: media channels 80 that contain streaming media records 86 (e.g., audio packets); and definition record channels 82 that contain records of definitions 88. Examples of media records 86 include audio codec and text. Examples of definition records 88 include session maintenance definitions (e.g., keepalive/acknowledgement definition records), client provisioning definitions (e.g., definitions of processing graph elements, such as audio processing elements), definitions of 3D rendering assets (e.g., texture and mesh), and definitions of RDS (e.g., avatar motion checkpoints).

The definition records 88 and the media records 86 are encapsulated in stream transport protocol records. The stream transport protocol records are encrypted by an encryption process 84, sequenced with packet numbers, and include a message integrity field. The sequencing of the stream transport protocol records is independent of the record source or purpose—it is a link-level feature used to detect out-of-order or missing records. The stream transport protocol records are identified by channel. GUIDs are used as channel identifiers. Definition records 88 and media records 86 may be compressed at the channel level using respective channel-specific compressors 90, 92, independently of the stream transport protocol record encapsulation. Each stream transport protocol record typically contains one or more definition records 88 or one media packet 96. The stream transport protocol records are delivered over the transport stream 78 as payloads of packets that are formatted in accordance with a transport protocol (e.g., UDP, TCP, HTTP, and PPP).

In the embodiment shown in FIG. 3, the stream transport service 72 is a component of a four-layer protocol suit that includes an application layer 91, a transport layer 93, a network layer 95, and a link layer 96. The application layer 91 contains user-level processes that interface the communicant to the network. The transport layer 91 includes the stream transport service 72 and a transport protocol 99 (e.g., User Datagram Protocol (UDP)), and interfaces the application layer 93 with the network layer 95. The network layer 95 manages movement of data through the network in accordance with one or more protocols (e.g., Internet Protocol (IP), Internet Control Message Protocol (ICMP), and Internet Group Management Protocol (IGMP)). The link layer 97 manages the details of physically interfacing with the network media (e.g., Ethernet cable, etc.) and typically includes a device driver component of the operating system and the physical network hardware components (e.g., Network Interface Card (NIC)) of the client node 70.

B. Publish and Subscribe Data Sharing Model

In some embodiments, data is shared by the network nodes in accordance with publish/subscribe model, which typically is connectionless. In these embodiments, the client nodes 12, 14 subscribe to only the data they need. The server node 16 determines what channels are needed by each of the client nodes 12, 14 based on the respective states (i.e., active or inactive) of their sources and sinks. The server application 38 sends to each of the client nodes 12, 14 respective publish messages indicating what information streams are available for that client, tagging each stream with a GUID handle. Each of the client processes 74 operating on each client node may subscribe to zero or more of the channels. A client process 74 that subscribes to a channel registers with the local stream transport service 72 to receive notification of channel state changes and channel records as they arrive. Each of the client nodes then subscribes to the desired channels from the other client nodes using well-known channel GUIDs that are specified by the server application 38. Any changes to server data for a particular channel will be sent as definition records to all the clients that have subscribed to that channel.

Figure 4:
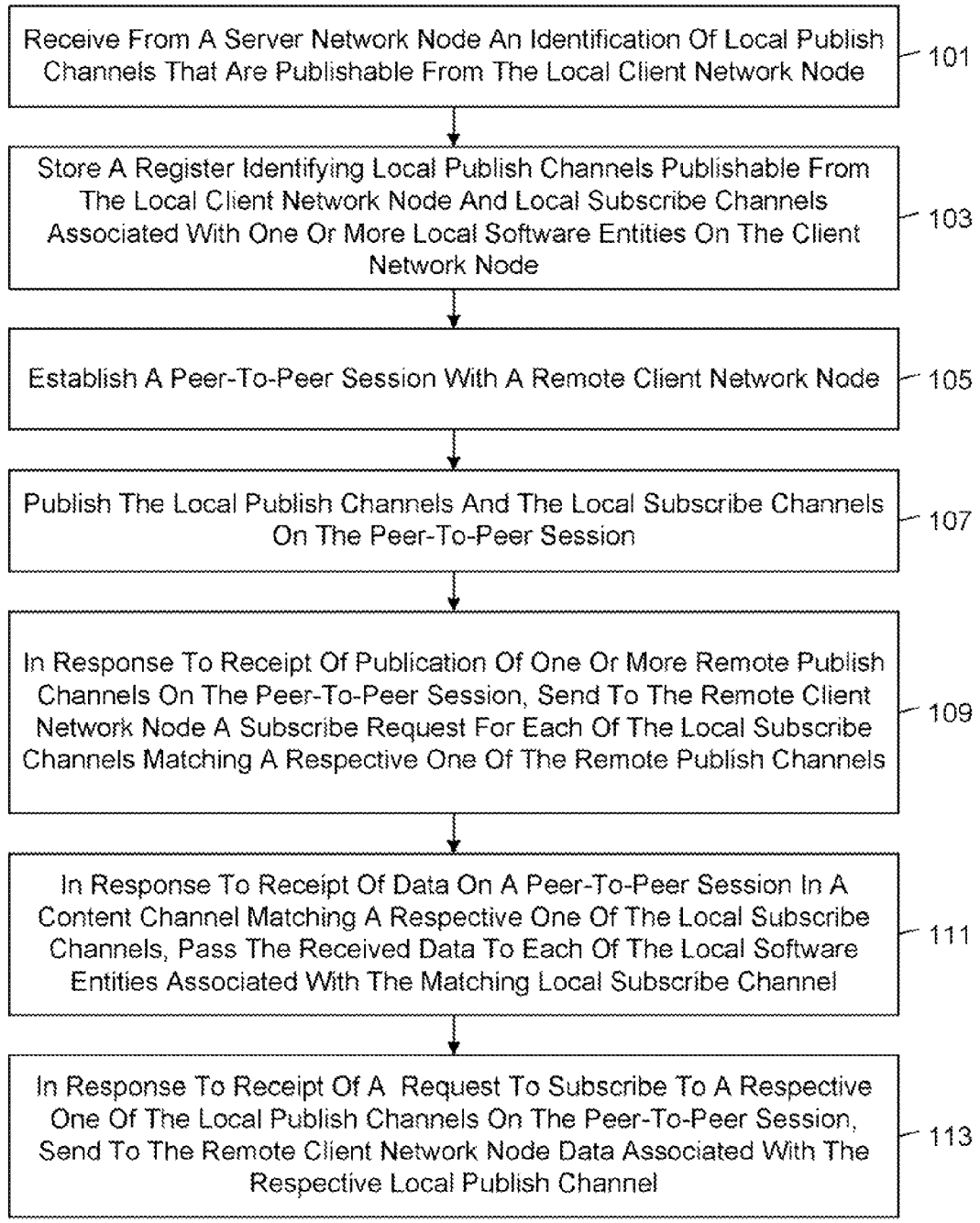
FIG. 4 shows an exemplary embodiment of a method of sharing data between network nodes in accordance with a publish and subscribe data sharing model.

FIG. 4 shows an embodiment of a method by which the client network nodes 12, 14 share data with each other in accordance with a publish and subscribe data sharing model. In this method, a local client network node receives from a server network node an identification of local publish channels that are publishable from the local client network node (FIG. 4, block 101). These publish channels correspond to content that can be sourced from the local client network node. The local client network node stores a register identifying the local publish channels that are publishable from the local client network node and local subscribe channels associated with one or more local software entities on the local client network node (FIG. 4, block 103). The local client network node establishes a peer-to-peer session with a remote client network node (FIG. 4, block 105). The local client network node publishes the local publish channels and the local subscribe channels on the peer-to-peer session (FIG. 4, block 107). In response to receipt of publication of one or more remote publish channels on the peer-to-peer session, the local client network node sends to the remote client network node a subscribe request for each of the local subscribe channels matching a respective one of the remote publish channels (FIG. 4, block 109). In response to receipt of data on a peer-to-peer session in a content channel matching a respective one of the local subscribe channels, the local client network node passes the received data to each of the local software entities associated with the matching local subscribe channel (FIG. 4, block 111). In response to receipt of a request to subscribe to a respective one of the local publish channels on the session, the local client network node sends to the remote client network node data associated with the respective local publish channel (FIG. 4, block 113).

Referring back to FIG. 3, the stream transport service 72 maintains a register 94 (e.g., a table) of local publish and subscribe entries. Each entry in the list contains:

An identifier of the local client process 74 that created the entry

A server identifier

A channel identifier

An indication of whether the entry is a publish entry or a subscribe entry (for Subscribe) One or more transport parameters The register 94 of local publish and subscribe entries is initialized with {StreamTransportServiceID, GUID_NULL, SessionChannelID, Subscribe, Reliable, Uncompressed}

In this way, the stream transport service 72 (which is identified by the StreamTransportServiceID) subscribes to all arriving definitions records 88 arriving on any session channel, including publish and subscribe definition records. The GUID_NULL channel is never published and every server assumes the GUID_NULL channel to be subscribed with a well-known channel ID on every transport stream.

The stream transport service 72 also maintains a register 96 of all arrived publish definitions, for use in case a late subscribe is registered in the local list.

{IDClient, IDServer, IDChannel}

Where IDClient is a (possibly NULL) GUID of a particular client process 74 for which the channel is intended, IDServer is the remote source of channel records and IDChannel is a well-known GUID of a channel.

When the stream transport service 72 receives a session definition for a connection to another station, the stream transport service 72 establishes the stream, sends the session definition, and then sends all of the stored local publish entries in a definition record on the session channel. When a publish definition arrives at a stream transport service 72, the stream transport service 72 enters that definition into the publish definition table and then sends a subscribe definition on the session channel for each subscribe entry in the local list that had a matching Channel ID in the publish record. When a subscribe definition arrives, the stream transport service 72 begins sending definition updates (piped from the publishing server application 38) on the given definition record channel containing the definition records for that definition. The definition records may be sent on more than one channel.

When a client process 74 desires to participate in a channel with a server, the client process 74 defines a subscribe request, whether or not any transport streams exist to any servers. If the server application 38 publishes later (i.e., after stream is established) then the change in the local table triggers re-sending of the publish entries in the remote publish definition table 96, which automatically triggers any latent subscribe on the other end of the transport stream. If a client process 74 subscribes later and there is an entry in the publish table 96, then the stream transport service 72 sends the subscribe request automatically. This process ensures that channel data is sent over a transport stream only if it is desired by the receiver.

C. Soda Definition Records

In some embodiments, the definition records that are transmitted by the network nodes are SODA (Sococo Definition Architecture) records. Each SODA record contains one or more SODA definitions. Examples of SODA definitions session maintenance definitions (e.g., keepalive/acknowledgement definition records), client provisioning definitions (e.g., definitions of processing graph elements, such as audio processing elements), definitions of 3D rendering assets (e.g., texture and mesh), and definitions of RDS (e.g., avatar motion checkpoints).

SODA records are nested structures with an initial GUID ID and one or more SODA definitions. A SODA definition has a definition type, a definition length, and zero or more fields. The definition type is a well-known GUID (e.g., guidAsset and guidAudioMix). The length indicates total size of the SODA definition including all fields. Fields are a combination of type-specific fixed fields and nested SODA definitions. That is,

```
SODA Record:
   guid ID
   SODA definition
   ...
SODA Definition:
   Guid DefinitionType
   long length;
   [Field]-depend upon definitionType
Field:
   Fixed field
   Or SODA Definition
```

For example.

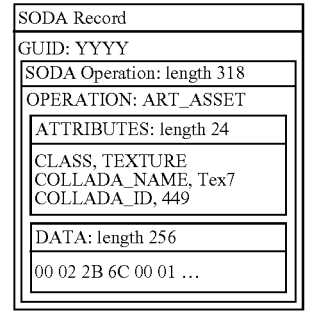

D. Straw Channels and Straw Packets

The instances of the stream transport services operating on different network nodes communicate over channels, which are logical subdivisions of session traffic. In some embodiments, the channels are implemented by STRAW (Sococo TRAnsport for WAN) channels, each of which is identified by a Channel ID and is defined as a Content ID, a Compression ID, a set of Flags and a string of Compression Preload data. In these embodiments, a channel is a logical construct that transfers SODA or media records between two network nodes in a session. A channel can be reliable or unreliable, compressed or non-compressed.

The content of a channel is identified by the Content ID. Content IDs are well-known UUIDs—they are placed in header files and published in a database so that application developers can write services to field them. The communications services on the server node 16 are configured to send messages on the appropriate channels so that the content types of the messages match the Content IDs of the channels (e.g., chat messages are sent on chat channels and RDS messages are sent on RDS channels). Services will ignore messages that are sent on the wrong channel.

Every Channel on every Session has a different Channel ID. Services (e.g., client processes 74) bind to channel data using the Content ID. All of the other fields of the Channel definition are for stream transport service 72 to use in transmitting and prioritizing Channel data.

Flags include:

| | |
|---|---|
| Reliable | Deliver all data packets |
| KeyFrameUser | Data packets may use the KeyFrame flag |
| Compressed | Data packets must be processed intact (not diced up as a stream for example) |
| OrderIndependent | Packets may be processed in any order upon receipt |

Examples of Service Channel Content types are:

| | |
|---|---|
| AUDIOMONO | Audio content with flags {KeyFrameUser}. The absence of the Reliable flag implies the stream should be delivered unreliably (missed packets are not retransmitted). The lack of the OrderIndependent flag implies that stream data must be processed in order upon receipt. The lack of the Compressed flag implies the data is not compressed by STRAW (the audio codec already compressed the data). |

| | -continued |
|---|---|
| KVMMEDIA | Screen schare content with flags {Reliable, KeyFrameUser}. The Reliable flag implies all packets must be retransmitted until received. The lack of the OrderIndependent flag implies that stream data must be processed in order upon receipt. The lack of the Compressed flag implies the data is not compressed by STRAW (the audio codec already compressed the data). |
| SESSION | Session content with flags {Reliable}. All packets on this channel contain Soda records; all must be reliably transmitted and processed in order. The Compression flag could also be present as required. |

Channel records are transported in a sequence of STRAW records sharing the same header CHANNEL ID and with sequential packet numbers and a MAC field. The MAC calculation depends upon the packet sequence on the given channel in one direction only. All STRAW records that are transmitted on a single channel share a single set of configuration parameters (e.g., {Client, reliable, compressed}). Records on a single channel are compressed as a serial stream as illustrated below.

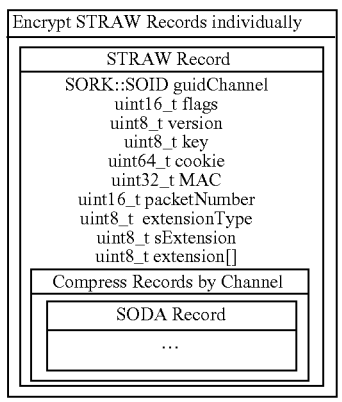

Only reliable channels normally can be compressed. In some embodiments unreliable channels can be compressed with a compression process in which compression restarts on each key frame. In the case of a lost packet on an unreliable channel, records on that channel are discarded until a key frame is reached (because they cannot be decompressed out of order). In some embodiments, definition records are compressed using a compression dynamic linked library on each of the client network nodes. To improve compression a channel definition can include preload data, which is run through the compressor but not transmitted. The purpose is to prime the compression state tables with common phrases. The compression state table is reset and rebuilt each time a key frame is received.

The stream transport service 74 encapsulates SODA definitions in stream transport protocol records that include respective channel identifiers. The stream transport service 74 then sends the stream transport protocol records to the transport protocol 99 for further encapsulation before transmission to the underlying networking and link layers 95, 97.

Figure 5:
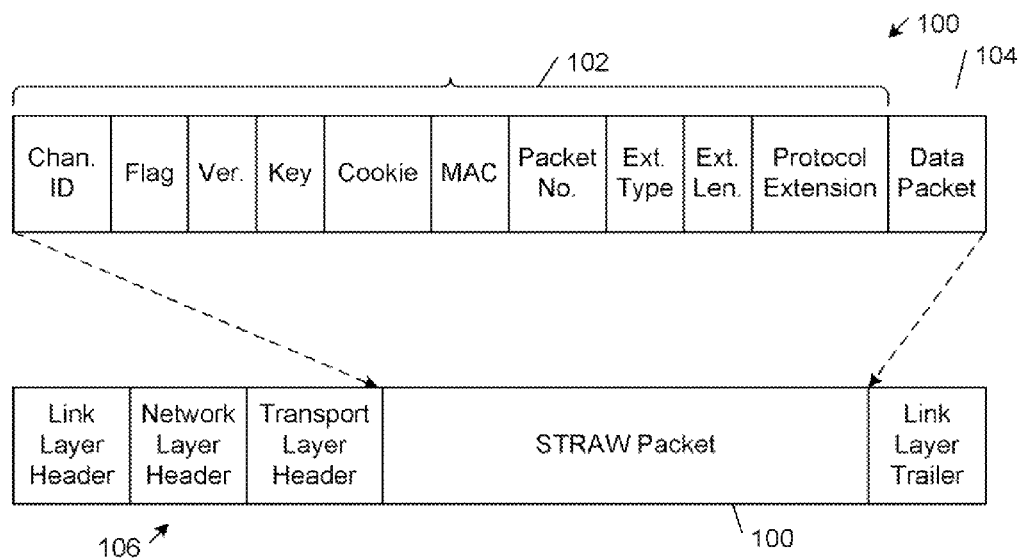
FIG. 5 shows an exemplary embodiment of a stream transport protocol record.

FIG. 5 shows an embodiment 100 of a stream transport protocol record that is referred to herein as a STRAW packet. The STRAW packet 100 starts with a STRAW Record 102, which has a 128-bit Channel ID (UUID), a 16-bit Flag field, an 8-bit version field, an 8-bit key field, a 64-bit cookie field, a 32-bit MAC field, a 16-bit Packet Number, an 8-bit Extension Type field, an 8-bit Extension Length field, and an optional Extension Protocol field. The KEY field identifies the cipher used to encrypt the message (0 means not encrypted). The Packet Number starts at zero and increments with each packet in the stream. When the Packet Number reaches 65535, it returns to zero and keeps counting. The packet number and Flags are in "Big-Endian" order. Following the STRAW Record 102 is the data packet 104 that contains SODA records.

The Flags Include:
TF_KEYFRAME=1
TF_NAKED=2
TF_MEDIA=4
TF_COMPRESSED=8
TF_SESSIONMAINTENANCE=16
TF_LOCALPACKET=32
TF_FIRST=64
TF_PROXIED=128
TF_MULTI=256
TF_RESEND=512
TF_WINDOWDELAY=1024
TF_FRAMESTART=2048

Each packet sets the flags as needed. Any Channel may contain packets with flags set in any pattern. Not all combinations are valid.

The KEYFRAME bit implies out-of-band information transmitted in a stream. This flag is usually set on parameter packets transmitted in a media stream. The meaning of the flag is entirely Communicant-Service-Specific.

The NAKED flag means no Soda Record header will be present.

The MEDIA flag means the interpretation of all packet bytes following the STRAW Record are Communicant-Service-Specific.

The COMPRESSED flag means the content has been compressed by a Channel Service. The meaning of this flag is outside the definition of STRAW.

The SESSION MAINTENANCE flag means the packet is intended as STRAW protocol, is unreliable even on a reliable channel, is idem-potent and the packetNum field is not to be interpreted.

The LOCALPACKET flag means the packet was sourced locally and is not actually in a transport buffer. This flag is set for "loopback" style testing or by applications which need to insert a locally generated packet into the processing stream.

The FIRST flag is an internal STRAW stack flag meaning the message is to be queued for transmission at the head of the queue.

The PROXIED flag means the packet has been forwarded by a Proxy.

The MULTI is an internal STRAW stack flag meaning the STRAW header is to include the MULTI protocol extension.

The RESEND flag means the packet was previously transmitted, and this copy is a duplicate.

The WINDOWDELAY flag means

The FRAMESTART flag means the content has been divided into multiple packets, and this packet is the first in the series.

The MAC field is a hash calculated on everything following the MAC field, including the rest of the packet (e.g., soda definitions or media). The MAC has a quick-check calculation and an exhaustive check calculation. The quick check can be used by a router, relay, protocol sniffer or transport layer to validate that a UDP packet contains a STRAW packet. An example of a quick check is (HighWord XOR LowWord==CheckValue). An example of the exhaustive check is (XOR(packet ID, packet number, and extension fields as 16-bit words)==HighWord).

The Extension Type byte determines what immediately follows the STRAW Record. If Extension Type is zero (0) there is no protocol extension. If Extension Type is one (1) and the Extension Length is 6, the protocol extension is the MULTI structure which has a 16-bit PacketFirst field, a 16-bit PacketLast field and a 16-bit PacketLength field. MULTI is used to group sequential packets that define a packet that is longer than would fit in a single UDP payload as follows:

| PacketFirst | PacketLast | MessageLength |
|---|---|---|
| 2 bytes | 2 bytes | 2 bytes |

The packets in the multi-packet sequence have packet numbers within the range PacketFirst to PacketLast inclusive. The total packet length defined by the sequence is PacketLength in size (bytes). All packets comprising the sequence must have the MULTI extension with identical field values. If any of the packets in the sequence are missing on an unreliable channel, the entire sequence is discarded and the large packet is considered dropped. If any of the packets in the sequence are missing on a reliable channel, the missing packet may be requested by the receiver and resent. Since PacketLength is 16 bits, the largest packet definable using MULTI is 32767 bytes in length, excluding the STRAW record fields with Extension fields.

Following the STRAW Record 102 is the data packet 104. The length of the data packet 104 is determined from the payload size of the transport protocol that is used to transport the STRAW packet 100 over the network (e.g., UDP). The length of the data packet 104 typically is transmitted to the stream transport service 72 out-of-band by a transport protocol network API that is provided by the operating system of each network node. The data packet format is specific to the Channel Content ID.

Figure 6:
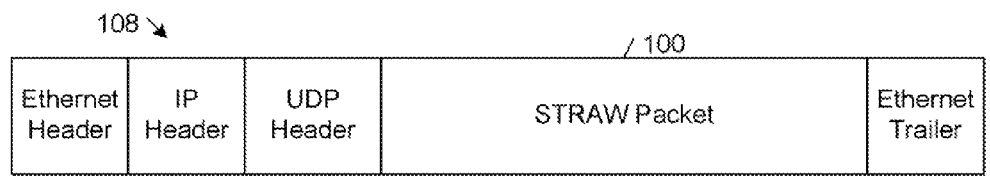
FIG. 6 shows an exemplary embodiment of a stream transport protocol record encapsulated in an Ethernet frame.

As shown in FIG. 5, the STRAW packet 100 is transmitted as a payload of a link layer frame 106, which is transmitted across the network. In the illustrated embodiment, the link layer frame 106 starts with a Link Layer Header, a Network Layer Header, and a Transport Layer Header, and ends with a Link Layer Trailer. In general, the transport protocol packet 106 may correspond to any type of link layer protocol. FIG. 6 shows an exemplary embodiment in which the STRAW Packet 100 is encapsulated in an Ethernet frame 108, which starts with an Ethernet Header, an IP Header, and a UDP Header, and ends with an Ethernet Trailer.

E. Sessions

1. Introduction

Sessions between the network nodes can be established over any type of serial communications protocol stream (e.g., UDP, TCP, HTTP, and PPP). In some embodiments, a stream is a bi-directional UDP socket between two network nodes defined by two IP address/port pairs, and a transport GUID. A stream supports sessions of channels. A session is a logical node-to-node connection. Sessions transport channels for the two nodes. Sessions may pass through one or more proxy nodes and are transported over streams that may contain multiple sessions.

The client nodes 12, 14 and the server node 16 communicate with each other over respective pair-wise sessions, where each of the client nodes 12, 14 establishes a respective server session 40, 42 with the server node 16 and also establishes a peer-to-peer (P2P) session 44 with the other one of the client nodes 12, 14. The sessions 40-44 are divided logically into channels that are identified by the identifier contained in the first field of the STRAW Record 102 (i.e., the Channel ID field; see FIG. 5). Exemplary types of channels include session channels, station channels, and content channels. Session channels are identified by the presence of a session identifier in the Channel ID field of the STRAW Record 102 and are designated for carrying data (e.g., StreamStats, Pings, and Keepalive messages) relating to session management tasks. Station channels are identified by the presence of a station identifier in the Channel ID field of the STRAW Record 102 and are designated for carrying data relating to network address resolution tasks. Content channels are identified by the presence of a content identifier in the Channel ID field of the STRAW Record 102 and are designated for carrying content data (e.g., audio data, chat data, and screen share data).

Figure 7:
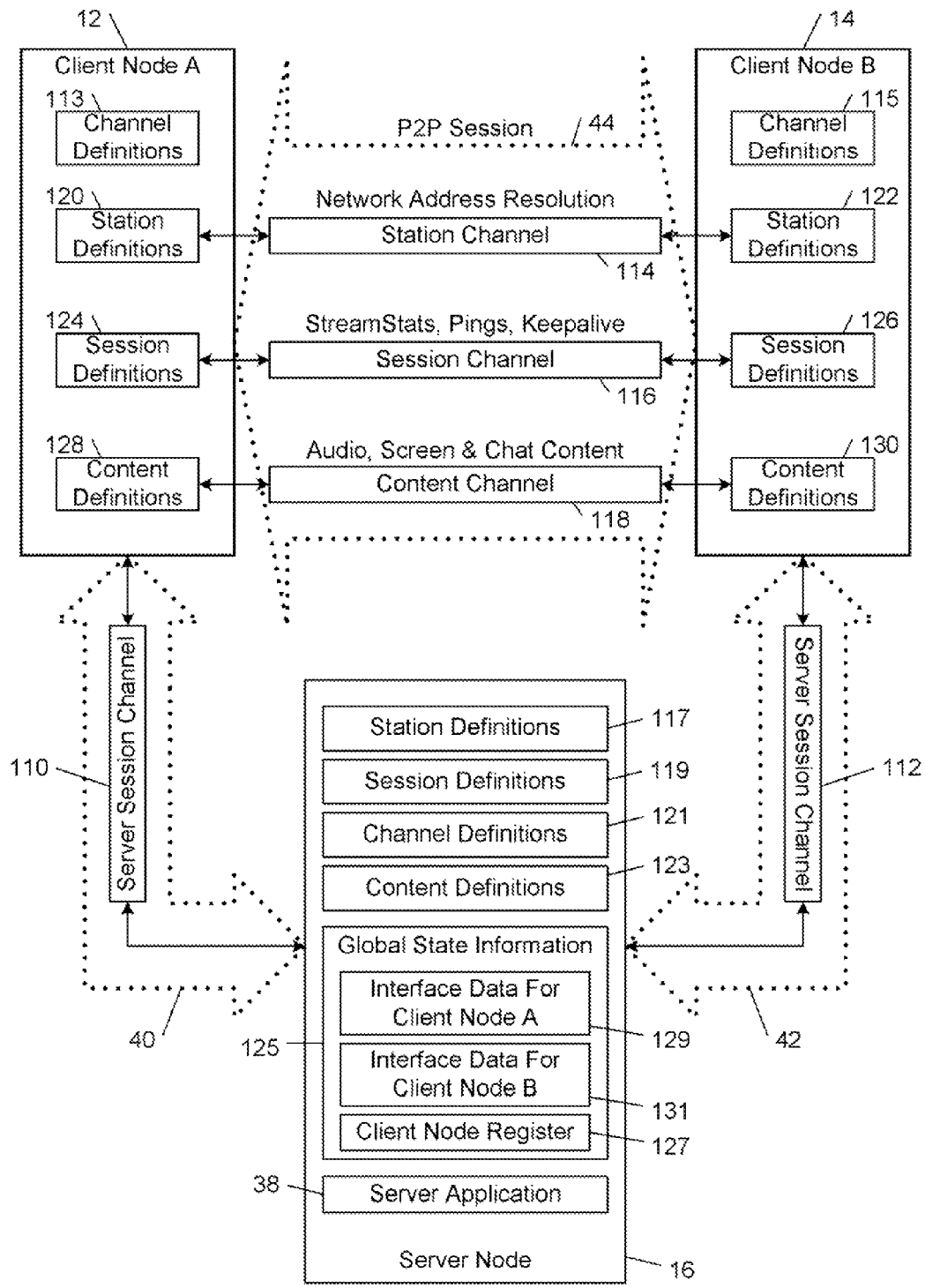
FIG. 7 shows an exemplary embodiment of an exemplary embodiment of the network communication environment of FIG. 1 in which client and server network nodes communicate on various channels in the respective sessions that are established between the network nodes.

FIG. 7 shows an exemplary embodiment of the network communications environment 10 in which the client and server network nodes 12-16 communicate on various channels in the respective sessions 40-44 that are established between the network nodes 12-16. In the illustrated embodiment, the server node 16 communicates with each of the client nodes 12, 14 on a respective server session channel 110, 112 in the server sessions 40, 42, and the client nodes 12, 14 communicate with each other on a station channel 114, a session channel 116, and a content channel 118 in the peer-to-peer session 44. In some embodiments, data is shared between respective nodes in a session as definition records over STRAW sockets in accordance with a publish/subscribe model, as described above. The instances of the stream transport service 72 operating on the client nodes 12, 14 subscribe only to the data that are needed by the client network nodes. To subscribe, a stream transport service instance creates a STRAW channel to a target network node by negotiating a particular Channel ID, which is a well-known UUID in the namespace defined for the server application 38.

The server node 16 maintains data for provisioning the client nodes 12, 14 to communicate in accordance with the server application 38. Among the types of data that the server node 16 maintains are station definitions 117, session definitions 119, channel definitions 121, and content definitions 123.

In some embodiments, each of the client network nodes is assigned a respective unique station identifier. For each of the client network nodes, the server network node determines a respective station definition that includes the respective station identifier and one or more entries each of which comprises a respective connectionless transport protocol address and a respective protocol port identifier for a protocol port on the client network node. In some exemplary embodiments, each station definition 117 includes a persistent Station ID that uniquely identifies a respective network node and a set of source addresses (e.g., {IP address, Socket Port, Protocol ID} entries) that are associated with the respective network node. In some embodiments, the server network node determines the entries in the station definition for a client network node by extracting a respective network address and a respective protocol port identifier for a protocol port on the client network node from each of one or more message received from the client network node.

In some embodiments, each session definition 119 includes a Session ID that uniquely identifies a respective session, a pair of Station IDs that identify the constituent network nodes designated to communicate over the respective session, a Transport ID that identifies the transport protocol to be used for the respective session, and an Encryption ID that identifies an encryption protocol to be used for the respective session. In some embodiments, the Encryption ID is replaced by a set of Cipher definitions which are SODA definitions that have the following fields:

SOID soidStrawCipher; —wellknown guid of the cipher e.g. DES
    SOID soidKeyPurpose; —data tx, data rx, key tx, key rx
    SDData<unsigned char*>sdKeyData; —the actual key appropriate for the cipher (e.g. DES 56-bit)

Since a Station ID resolves to a Station definition including a set of source addresses (e.g., {IP address, Socket Port} pairs), the Session definition is sufficient to attempt communication between the network nodes.

In some embodiments, one or more of the channel definitions 121 is associated with a respective unique content identifier that identifies a respective data stream content type assigned to the channel. In some of these embodiments, each channel definition 121 includes a unique Channel ID, a wellknown Content ID, a Compression ID, a set of Flags, and a string of Compression Preload data. Each content definition 123 is a respective SODA definition that has a definition type, a definition length, and one or more fields. In some of these embodiments, one or more of the flags correspond to transport parameter values controlling transport of data on the respective channel independently of transport of data on any of the other channels. In some embodiments, one or more of the channel definitions includes a respective reliability transport parameter value that indicates whether data on the respective channel are to be transported by either a reliable transport protocol in accordance with which missed data packets are retransmitted or an unreliable transport protocol in accordance with which missed data packets are dropped. In some embodiments, one or more of the channel definitions includes a respective compressed transport parameter value that indicates whether or not data on the respective channel are required to be processed intact. In some embodiments, one or more of the channel definitions includes a respective ordering transport parameter value that indicates whether data on the respective channel are to be processed in order or in any order. In some embodiments, one or more of the channel definitions includes a respective compression identifier that specifies a respective compression process for compressing data transported on the respective channel.

The server node 16 also maintains global state information 125 that includes a current register 127 of the client nodes that are connected to the server application and interface data 129, 131 that identifies the data sources and sinks of the client nodes and the respective states of the sources and sinks (i.e., active or inactive).

The server network node creates a universally unique Channel ID for each pair of currently active complementary sources and sinks between session partners. Therefore, each of the currently available channels is identified by a respective Channel ID that is unique to the current conversation between the client network nodes and messages sent with that Channel ID can be trusted as being authentic and from the session partner. For example, in response to receipt of a message from the a first session partner to turn off its local microphone, the server node 16 instructs the second session partner to tear down its microphone audio channel processing graph, which removes the associated subscribe to the original audio channel; and in response to a message from the first session partner to turn back on the local microphone, the server node 16 creates a new audio channel with a new unique Channel ID and instructs the second session partner to subscribe to the new audio channel and to create a new microphone audio processing graph for processing the microphone data on the new audio channel. The second session partner will ignore any packets that are received on the original audio channel after receipt of the instruction to tear down the original microphone audio channel processing graph.

The server node 16 provisions each of the client nodes 12, 14 for communicating in accordance with the server application 38 by sending definition records over the respective server session channel 110, 112. In this process, the server node 16 sends publish messages indicating the channels that are available to the client nodes 12, 14, tagging each with a GUID handle. The instances of the stream transport service 72 operating on the client nodes 12, 14 send subscribe messages for the desired data streams to the server node 16. Any changes to the provisioning data for the subscribed channels are sent as definition records to all client network nodes that have subscribed to those channels.

Over each of the server sessions, the server network node transports control messages of different content types on different respective channels that logically divide the control messages by content type. Each of the control messages typically is sent with a unique server session identifier that is assigned to the server session and a respective content identifier that identifies the content type of the control message. In some embodiments, the server network node transmits to each of the client network nodes connected to the server application the respective unique station identifiers that are assigned to the other client network nodes. In some of these embodiments the server network node also transmits a station definition of a proxy server to each of the client network nodes connected to the server application. The station definition of the proxy server typically includes the respective station identifier assigned to the proxy server and one or more entries each of which includes a respective network address and a respective protocol port identifier for a protocol port on the proxy server.

In response to receipt of the definition records from the server node 16, the respective instances of the stream transport service 72 operating on the client nodes 12, 14 update locally stored tables containing channel definitions 113, 115, station definitions 120, 122, session definitions 124, 126, and content definitions 128, 130. These definitions are used by the instances of the stream transport service 72 to determine whether or not to process incoming data packets and to determine how the incoming packets should be demultiplexed for consumption by the stream transport service 72 and the other client processes 74.

In some embodiments, a given client network node receives from the server network node a respective station definition for each of one or more of the other client network nodes connected to the server application. In the process of establishing a respective session for each of the received session definitions comprises, the given client network node determines the one or more entries in the station definition of the respective session partner client network node based on the station identifier in the session definition and, for each of the entries, attempts to establish a respective network connection with the respective session partner client network node through the respective network address and the respective protocol port identifier. In some of these embodiments, each of the session definitions includes a transport identifier associated with a connectionless transport protocol for establishing the network connection. In the process of establishing a respective session for each of the received session definitions comprises, the given client network node attempts to establish the respective network connection with the respective session partner client network node in accordance with the connectionless transport protocol associated with the transport identifier in the respective session definition.

In some embodiments, in the process of establishing a respective session for each of the received session definitions, the given client network node: creates multiple network connections with the respective session partner client network node; establishes the respective session over a selected one of the created network connections; and maintains one or more of the un-selected ones of the created network connections alive during the established session over the selected network connection. In some embodiments, one or more of the session definitions is associated with multiple respective addresses for negotiating respective network connections with the respective session partner client network node. In these embodiments, for each of the at least one session definition, a given client network node will attempt to establish a respective network connection with the respective session partner client network node through all of the multiple respective addresses associated with the session definition. For each of the session partner client network nodes with which the given client network node has successfully established multiple concurrent network connections with the other client network node, the given client network node selects one of the multiple network connections with the session partner client network node and establishes a respective session over the selected network connection with the session partner client network node. In some embodiments, for each of the session partner client network nodes with which the given client network node has successfully established multiple concurrent network connections with the other client network node, the given client network node maintains one or more or more of the un-selected ones of the multiple concurrent network connections with the session partner alive during the respective session established over the selected network connection.

In some embodiments, a given client network node receives from the server network node a respective address of a proxy server network node. In these embodiments, the given client network node attempts to establish a respective network connection with the respective session partner client network node through each of the one or more respective address associated with the session definition and through the respective address of the proxy server.

In some embodiments, in the process of establishing a respective session with a respective session partner client network node, a given client network node extracts a respective source network address from each of one or more inbound messages containing the respective station identifier assigned to the respective session partner client network node. The given client network node also updates a locally stored station definition indexed by the station identifier assigned to the respective session partner client network node to include each extracted source network address that is not already included in the locally stored station definition.

In some embodiments, in the process of establishing a respective session with a respective session partner client network node, a given client network node sends an outbound message containing the unique station identifier assigned to the given client network node to the respective session partner client network node. In response to receipt of an inbound message responsive to the outbound message and containing the unique station identifier assigned to the respective session partner client network node, the given client network node extracts a respective source network address from the inbound message and binding the respective session partner client network node to the extracted source network address.

In some embodiments, in the process of establishing a respective session with a respective session partner client network node, a given client network node sends another outbound message containing the unique session identifier assigned to the respective session to the respective session partner client network node over a transport stream addressed to the network address to which the respective session partner client network node is bound. In response to receipt of an inbound message responsive to the other outbound message and containing the unique session identifier assigned to the respective session, the given client network node designates the transport stream as valid for transmitting data in the respective session. In response to failure of a given one of the created network connections, the given client network node typically attempts to re-create the given network connection with the respective session partner client network node.

In some embodiments, in response to receipt of an identification of local publish channels that are publishable from the given client network node, a given client network node publishes the local publish channels on each of the established peer-to-peer sessions. In response to receipt of a request to subscribe to a given one of the local publish channels on a given one of the established peer-to-peer sessions, the given client network node sends to the respective session partner client network node data associated with the given local publish channel. The given client network node determines local subscribe channels associated with one or more local software entities on the given client network node. In response to receipt of publication of one or more remote publish channels on a given one of the established peer-to-peer sessions, the given client network node sends to the respective session partner client network node a request to subscribe to each of the local subscribe channels matching a respective one of the remote publish channels. In response to receipt of data on the given peer-to-peer session in a respective one of the remote publish channels matching a respective one of the local subscribe channels, the given client network node passes the received data to each of the local software entities associated with the matching local subscribe channel.

In some embodiments, a given client network node transmits data streams to the respective session partner client network node on the given session in respective channels according to content type of the data streams. In this process, the given client network node typically transmits each of the data streams on a respective one of the channels in packets containing a respective one of the content identifiers corresponding to the content type of the data stream. For each of the channels in the given session that is defined by a reliability transport value indicating that data are to be transported on the channel by the reliable transport protocol, the given client network node transmits data packets on the channel, and re-transmits on the channel respective ones of the transmitted data packets in response to a determination that a count of the transmitted data packets whose receipt has not been acknowledged by the session partner client network node exceeds a window threshold specified by the session partner client network node. For each of the channels in the given session that is defined by a reliability transport value indicating that data are to be transported on the channel by the reliable transport protocol, the given client network node retains data packets transmitted on the channel, and releases retained data packets in response to receipt of acknowledgement that corresponding ones of the transmitted data packets have been received by the session partner client network node.

In some embodiments, the given client network node receives from the respective session partner client network node a session maintenance message comprising a send window size number and a receive window size number. The given client network node transmits data packets to the respective session partner client network node up to the send window size number of transmitted data packets whose receipt has not been acknowledged by the session partner client network node. The given client network node sends to the respective session partner client network node a respective session maintenance message responsive to receipt of at least the receive window size number of data packets from the session partner client network node since a preceding session maintenance message was sent to the session partner client network node. The respective session maintenance message sent by the given client network node typically includes, for each of the channels that is in an active state, a respective indication of a maximum packet sequence number of the packets received on the channel. The respective session maintenance message sent by the given client network node typically includes, for each of the channels that is in an active state, a respective identification of missing packets not received on the channel.

In some embodiments, the given client network node receives from the respective session partner client network node a session maintenance message comprising a first time parameter value and a second time parameter value. In response to a determination that the given session is in an active state, the given client network node transmits packet receipt acknowledgement session maintenance messages to the session partner client network node with a maximum interval set by the first time parameter value. In response to a determination that the given session is in an idle state, the given client network node transmits packet receipt acknowledgement session maintenance messages to the session partner client network node with a maximum interval set by the second time parameter value. In some embodiments, the client network node determines that the given session is in an active state in response to a determination that at least one data packet has been received from the session partner client network node before two consecutive session maintenance messages are transmitted by the given client network node to the session partner client network node. In these embodiments, the given client network node determines that the given session is in an idle state in response to a determination that no data packets have been received from the session partner client network node before two consecutive session maintenance messages are transmitted by the given client network node to the session partner client network node.

2. Provisioning Client Nodes

In the illustrated embodiments, the stream transport service instance operating on a network node is provisioned with a station definition of another network node before it attempts to establish a session with the other network node. In some embodiments, the provisioning process is initiated when the network node has been authenticated to the platform. After being authenticated, the network node receives a station definition of the server node 16. The network node uses the server node station definition to establish a session over a server session channel with the server node 16, which provisions the network node for communications with other network nodes that are connected to the server application 38. Exemplary types of definitions that the server node 16 sends to the client nodes over the server session channel include station definitions, session definitions, publish and subscribe definitions, transport report requests, proxy node definitions, station down messages that instruct the client to tear down a session, and ping messages.

Network authentication typically is made once each time the communications applications 28, 32 are launched on the client nodes 12, 14. In some embodiments, an account service is used to authenticate the client nodes 12, 14 and establish a real user identifier (RUID) for the communicant. The account service may be provided by the server node 16 or another server node (e.g., a dedicated account server node). The authentication process is initiated by the communications applications 28, 32, which contact the account service, authenticate, and identify the communicants respectively operating the client nodes 12, 14.

Figure 8:
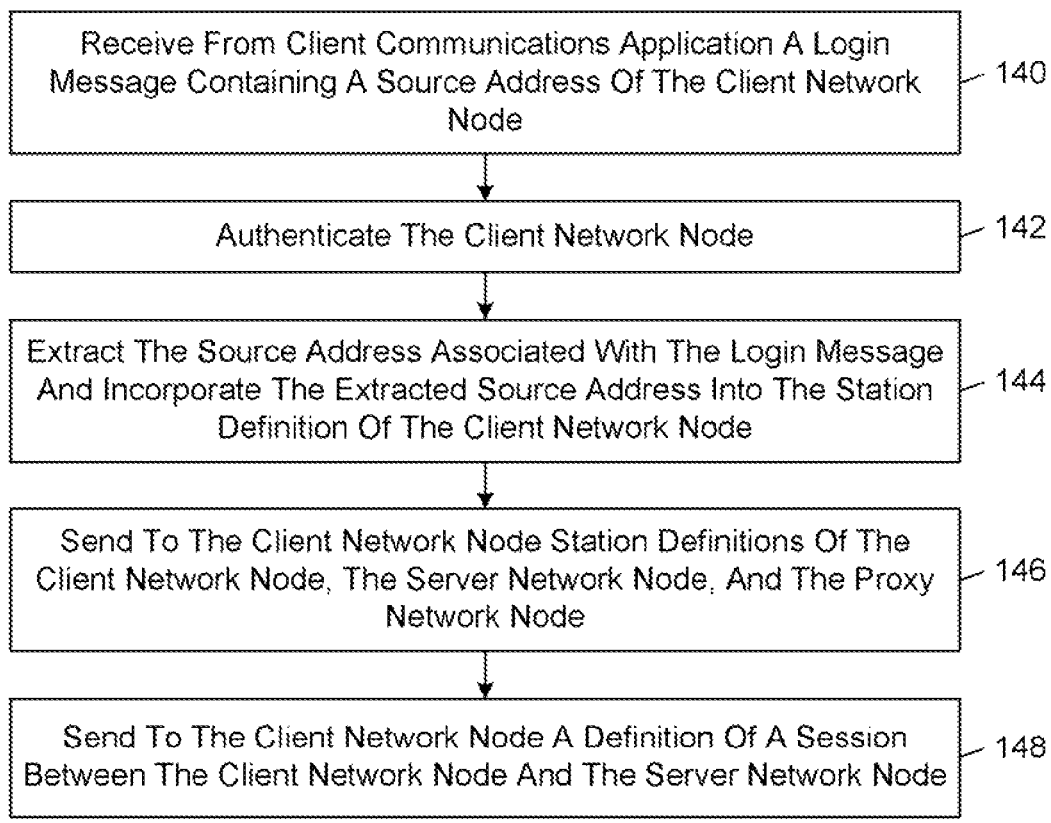
FIG. 8 shows an exemplary embodiment of a method of responding to a login message from a client node.

FIG. 8 shows an embodiment of a method by which the account service responds to a login message from the client node 12. The login message typically is transmitted to the account service out-of-band (e.g., via a Web Services exchange, such as SOAP).

In accordance with the method of FIG. 8, the account service receives from the client communications application 28 a login message containing a source address of the client node 12 (FIG. 8, block 140). The source address typically is embedded in a header of the packet containing the login message. The login message typically includes a Station ID that was assigned to the client node 12 at the time the communications application 28 was installed on the client node 12. The communication between the login service and the client communications application 28, 32 typically is an out-of-band communication via a Web Services exchange (e.g., SOAP), or over another session.

In response to the login message, the account service authenticates the client network node 12 (FIG. 8, block 142). In this process, the account service creates a token and gives it to the client network node 12 to authenticate itself to other servers (e.g., the server node 16 hosting the server application 38). In some embodiments, the account service also provides a random 128-bit challenge phrase to the client network node 12. The client network node 12 hashes the challenge phrase with a cryptographic digest of the communicant-provided password and returns this as a response. The account server also hashes the challenge phrase with the previously-obtained digest for that communicant and verifies that the response from the client network node 12 matches. The network connection is now authenticated and the communicant is identified as the owner of the private key. In some embodiments, as part of the login process, the account service sends the client network node 12 a set of encryption keys, including the cipher, purpose, and encryption keys, over a secure connection (e.g., an SSL or encrypted in-band link).

After authenticating the client network node 12, the account service extracts the source address that is associated with the login message received from the client node 12, 14, and incorporates the extracted source address into a station definition of the client network node (FIG. 8, block 144). The account service typically can extract the source address associated with the login message by calling a network service API of an operating system hosting the account service (e.g., a call to a network service provided through the Winsock API provided by a Microsoft® Windows® operating system).

The account service sends to the client network node 12 station definitions of the client node 12, the server node 16, and the proxy node 18 (if present) (FIG. 8, block 146). As explained above, each station definition includes a persistent Station ID that uniquely identifies the associated network node and a set of one or more addresses (e.g., {IP address, Socket Port, Protocol ID} entries) that are associated with the respective network node.

The account service also sends to the client network node 12 a definition of a session between the client network node 12 and the server network node 16 (FIG. 8, block 148). The session definition includes a Session ID that uniquely identifies a respective session, the Station ID of the client node 12, the Station ID of the server node 16, a Transport ID that identifies the transport protocol to be used for the respective session, and an Encryption ID that identifies an encryption protocol to be used for the respective session. In some embodiments, the Encryption ID is replaced by a set of Cipher definitions.

Figure 9:
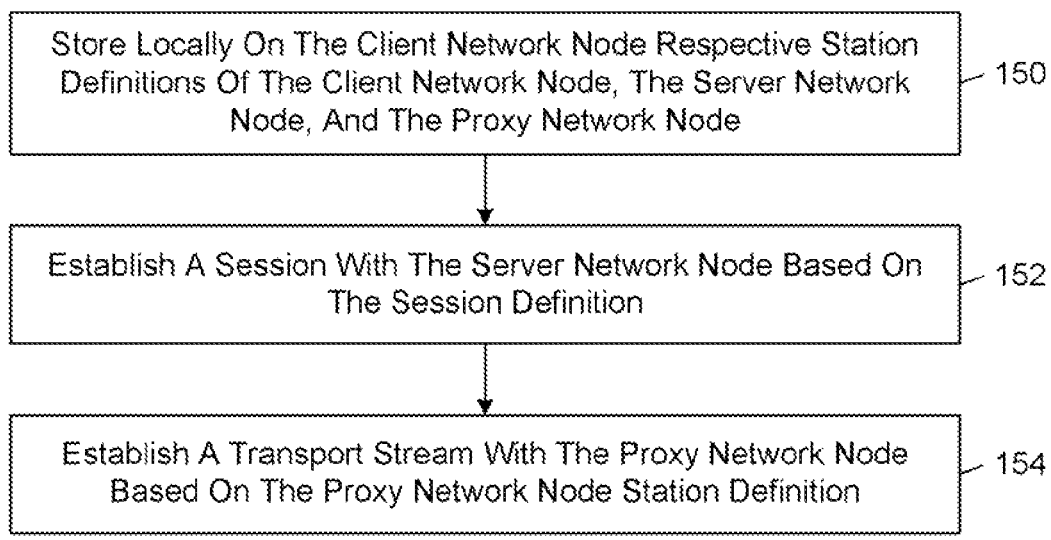
FIG. 9 shows an exemplary embodiment of a method of responding to the receipt of the station definitions from the account service.

FIG. 9 shows an embodiment of a method by which instances of the stream transport service 72 operating on the client nodes 12, 14 respond to the receipt of the station definitions from the account service. In accordance with the method of FIG. 9, the stream transport service 72 stores locally on the client network node the respective station definitions of the client network node, the server network node 16, and the proxy network node 18 (FIG. 9, block 150). These station definitions typically are stored in the stations definitions table 120 (see FIG. 7). The stream transport service 72 establishes a session with the server network node 16 based on the session definition (FIG. 9 block 152). If the proxy node 18 is present, the stream transport service 72 also establishes a transport stream with the proxy network node 18 based on the proxy network node station definition (FIG. 9, block 154). The processes by which the client node 12 establishes a session with the server node 16 and establishes a transport stream with the proxy node 18 are described below.

After the client nodes 12, 14 have established a session with the server node 16 (FIG. 9, block 152), the server node 16 provisions the client nodes 12, 14 for communications in accordance with the switching rules defined in the server application 38. In this process, the server node 16 acts as a central administrator. Each client node is provisioned explicitly to communicate with other client nodes and it will not talk to any unprovisioned network nodes that are not explicitly provisioned. If an unprovisioned network node attempts to communicate with the client node without first authenticating through the server node 18, the client node will not be able to communicate with it and communications from the unprovisioned network node will be ignored. Until the server node 18 creates a session definition between the client node 12 and the unprovisioned network node and provides both nodes with the session definition and definitions of the channels that are available between the nodes, there is no way for the client node 12 to communicate with the unprovisioned network node. In this approach, the client node and the unprovisioned network node do not discover each other and they do not work autonomously; instead, the server node 16 defines the communications that are possible between the client network nodes. This approach precludes possibility of any virus or other attack because each client node ignores communications from network nodes that are not explicitly authenticated and provisioned.

Figure 10:
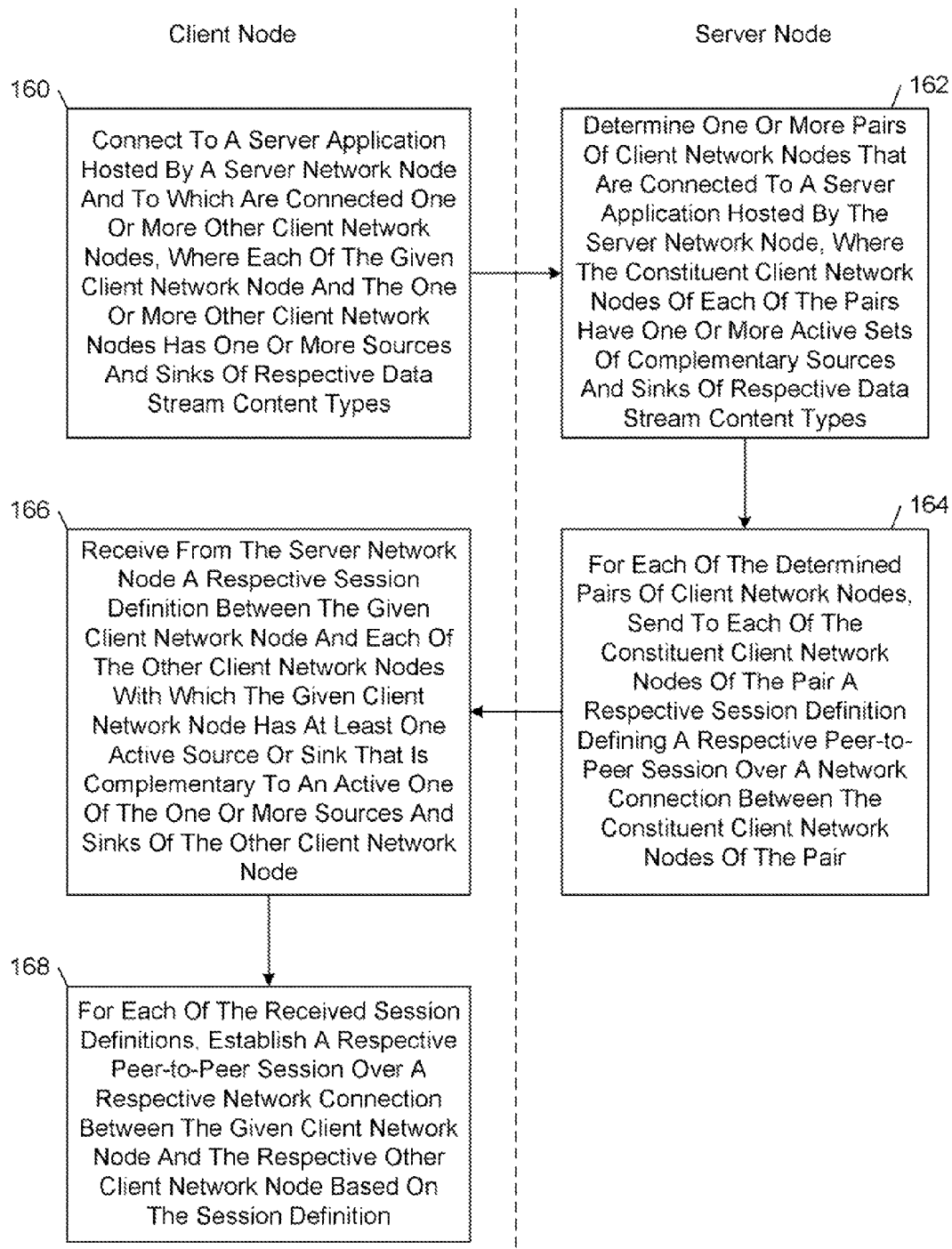
FIG. 10 shows an exemplary embodiment of a method of provisioning client nodes to communicate with one another.

FIG. 10 shows an embodiment of a method by which the server node 16 provisions the client nodes that are connected to the server application 38 to communicate with one another.

In accordance with the method of FIG. 10, a given client network node connects to the server application 38 that is hosted by the server network node 16 and to which are connected one or more other client network nodes, where each of the given client network node and the one or more other client network nodes has one or more sources and sinks of respective data stream content types (FIG. 10, block 160). The process by which a client node establishes a session with the server node 16 is described in the following section.

The server node 16 determines one or more pairs of client network nodes that are connected to the server application 38 that is being hosted by the server network node 16, where the constituent client network nodes of each of the pairs have one or more active sets of complementary sources and sinks of respective data stream content types (FIG. 10, block 162). In this process, the server node 16 searches the interface data 129, 131 that the server node 16 maintains for each of the client nodes 12, 14 for complementary active sources of sinks of each data stream content type that is permitted by the server application 38, and determines each pair of client nodes that have at least one active set of complementary sources and sinks between them. Examples of active sets of complementary sources and sinks, include an active microphone on one client node and an active speaker on another client node, an active screen sharing by one client node and an active screen viewing by another client node, and a respective active chat window on each of two client nodes.

For each of the determined pairs of client network nodes, the server node 16 sends to each of the constituent client network nodes of the pair a respective session definition defining a respective peer-to-peer session over a network connection between the constituent client network nodes of the pair (FIG. 10, block 164). For each of the determined pairs of client network nodes, the server network node typically generates the respective session definition to include (i) the respective station identifiers assigned to the constituent client network nodes of the pair, and (ii) a transport identifier associated with a connectionless transport protocol for establishing the network connection between the constituent client network nodes of the pair. For each of the determined pairs of client network nodes, the server network node also typically generates the respective session definition to include an encryption identifier (or a set of Cipher definitions) associated with an encryption process for encrypting data transported on the network connection between the constituent client network nodes of the pair. In some embodiments, each session definition includes a Session ID that uniquely identifies a respective session, the Station ID of a first one of the constituent client nodes, the Station ID a second one of the constituent client nodes, a Transport ID that identifies the transport protocol to be used by the constituent client nodes for the respective session, and an Encryption ID that identifies an encryption protocol to be used by the constituent client nodes for the respective session. In some embodiments, the Encryption ID is replaced by a set of Cipher definitions. The server node 16 also typically sends to each of the constituent client network nodes definitions of the channels that are available on the session.

The given client network node receives from the server network node 16 a respective session definition between the given client network node and each of the other client network nodes with which the given client network node has at least one active source or sink that is complementary to an active one of the one or more sources and sinks of the other client network node (FIG. 10, block 166).

For each of the received session definitions, the given client network node establishes a respective peer-to-peer session over a respective network connection between the given client network node and the respective other client network node based on the session definition (FIG. 10, block 168). The process by which two client network nodes establish a peer-to-peer session with each other is described in the following section.

3. Session Establishment

Any two network nodes that wish to exchange data with each other first are provisioned with a session definition that references the station definitions of the network nodes and optionally includes a Transport ID and an Encryption ID (or alternatively, a set of Cipher definitions). The stream transport service 72 on each network node uses the session definition to determine the Station ID of the other session partner network node, and then looks up the locally stored station definition of the other session partner network node to find a set of one or more addresses for negotiating respective network connections with the other network node. As described above, both the session definitions and the station definitions were received by the network nodes out-of-band beforehand.

After determining the one or more addresses that are associated with the session partners Station ID, the stream transport service 72 on each local network node transmits to each address (e.g., IP/Port pair) a StreamStats message on the Station Channel of the local network node (i.e., with the Station ID of the local network node as the Channel ID). This transmission burst to each of the session partner addresses typically is repeated with an exponentially-increasing back-off delay starting at, for example, 50 milliseconds (ms) and increasing at a rate of 1.5 times after each burst until a value exceeding 3 seconds is reached, at which point bursts occur every 3 seconds. In some embodiments, each StreamStats message is a STRAW packet that has a Channel ID that identifies the channel (e.g., station channel or session channel) and a payload that consist of a SODA record that has a SODA ID field and a dropped packets count field.

Typically, the session partners concurrently send respective StreamStats messages to each other until one or both of the session partners receives a StreamStats message. When any StreamStats message is received from remote network node (identified by the Channel ID), the local network node extracts the address (e.g., the IP/Port address) for the remote network node from the StreamStats message. In some embodiments, the stream transport service 72 on the local network node extracts the address associated with the StreamStats message by calling a service through a networking application programming interface (API) of a computer operating system running on the local network node. For example, in a network node running the Windows® operating system, the address extraction functionality is provided through a service contained within the Winsock API. After extracting the address of the remote node from the StreamStets message, the local network node sends a StreamElect message back to the extracted address on the Station Channel for the local network node. Each StreamElect message is a STRAW packet has a payload consisting of a SODA record with SODA ID field and a total length field. The local network node sends the StreamElect message on its Station channel by using its Station ID as the Channel ID of the STRAW packet.

When a StreamElect message is received from any remote network node, the local network node binds the remote network node to the network address that is extracted from the received StreamElect message. In this process, the stream transport service 72 on the local network node promotes the address that is extracted from the StreamElect message to the "net address current" by setting a bit in the locally stored definition of the remote network node. Setting the net address current bit marks that address as valid for use by the local network node to establish a session with the remote network node. At this point the network address of the remote network node has been resolved and a transport stream has been established between the local network node and the remote network node. The process of sending StreamStats messages and waiting for receipt of a StreamElect message from the remote network node ensures that the remote network node has received a message from the local network node sent to the net address current and that the local network node has received a message by the remote network node from the net address current.

Figure 11:
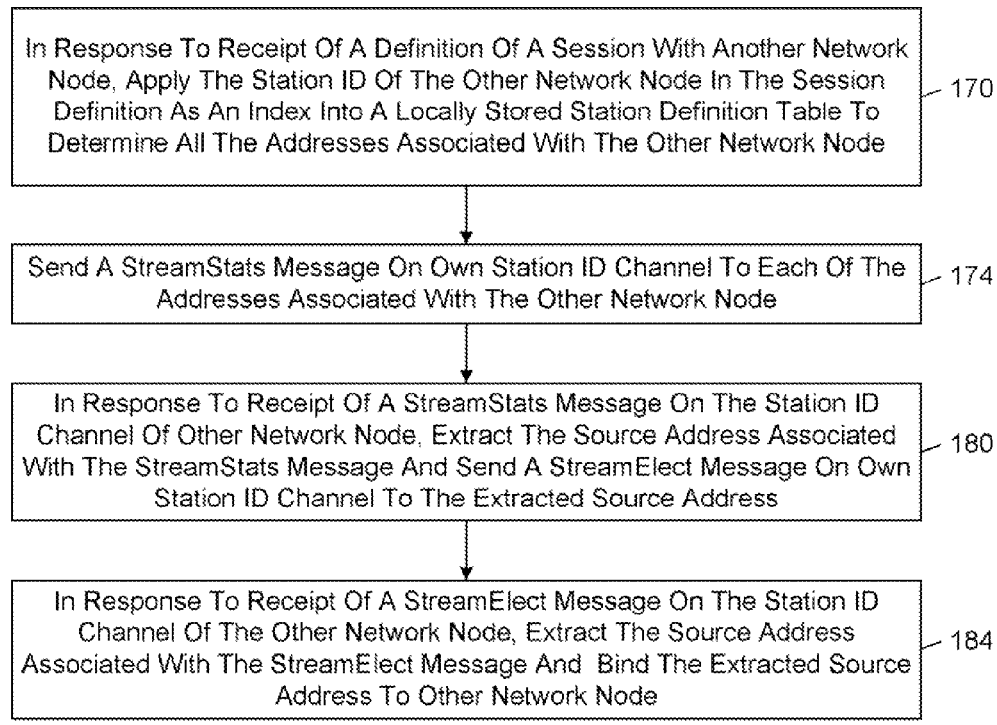
FIG. 11 shows an exemplary embodiment of a method of negotiating a link between client network nodes.
Figure 12:
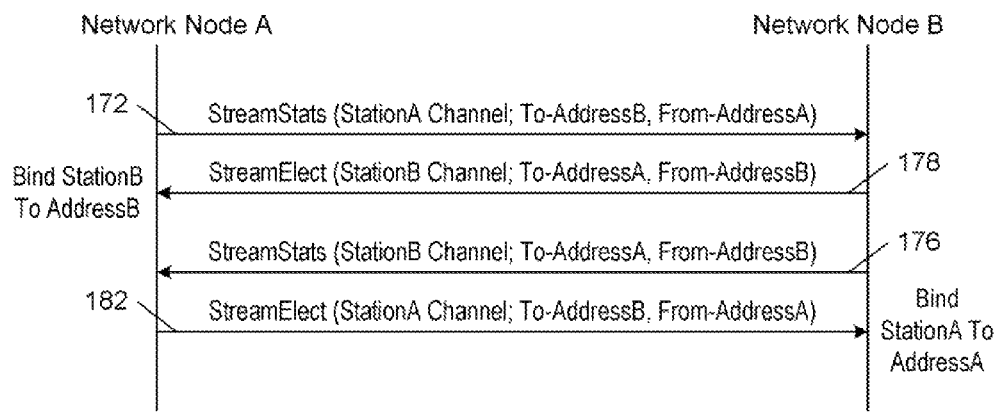
FIG. 12 shows an exemplary interaction diagram that contains a set of exemplary messages that are transmitted between client network nodes in an exemplary embodiment of the method of FIG. 11.

FIG. 11 shows an embodiment of a method by which first and second network nodes (e.g., Network Node A and Network Node B) negotiate a link with each other. FIG. 12 shows an interaction diagram that contains a set of exemplary messages that are transmitted between Network Node A and Network Node B in an exemplary implementation of the method of FIG. 11.

Referring to FIGS. 10 and 11, in response to receipt of a definition of a session with another network node, each network node applies the Station ID of the other network node in the Session definition as an index into a locally stored station definition table to determine all the addresses associated with the other network node (FIG. 11, block 170). Each network node sends a StreamStats Message (e.g., FIG. 12, messages 172 and 176) on its own Station ID Channel to each of the addresses associated with the other network node (FIG. 11, block 174

In response to receipt of a StreamStats message (e.g., FIG. 12, messages 176 and 172) from the other network node on the Station Channel of the receiving network node, each network node extracts the source address associated with the StreamStats message and sends a StreamElect message (e.g., FIG. 12, messages 178 and 182) on its own Station ID channel to the extracted source address (FIG. 11, block 180). In response to receipt of the StreamElect message (e.g., FIG. 12, messages 182 and 178) on the Station ID Channel of the other network node, each network node extracts the source address associated with the StreamElect message and binds the extracted source address to other network node (FIG. 11, block 184).

Once any network node is bound to particular address, the stream transport service 72 on the local network node begins sending a Ping message to the remote network node on the Session channel. Each Ping message is a STRAW packet has a payload consisting of a SODA record with SODA ID field and a timestamp field. The local network node sends the Ping message on the Session channel by setting the Channel ID of the Ping message to the Session ID. When a Ping message is received by a local network node from a remote network node on the Session channel, a transport stream has been established between the local network node and the remote network node, where the transport stream is defined by a pair of addresses (e.g., {IP, port}) and a transport GUID. In response to receipt of the Ping message, the local network node marks a bit associated with the remote network node in the locally stored Station Definitions table as Valid for use. When any remote network node is marked Valid, the stream transport service 72 on the local network node examines all the transport streams that have been established between the local and remote network node and selects the highest priority or highest ranking one of the transport streams for sending messages over the Session with the remote network node. The stream transport service 72 on the local network node establishes the session over the selected transport stream established with the remote network node by sending a StreamElect message on the Session Channel to the net address current of the remote network node.

Figure 13:
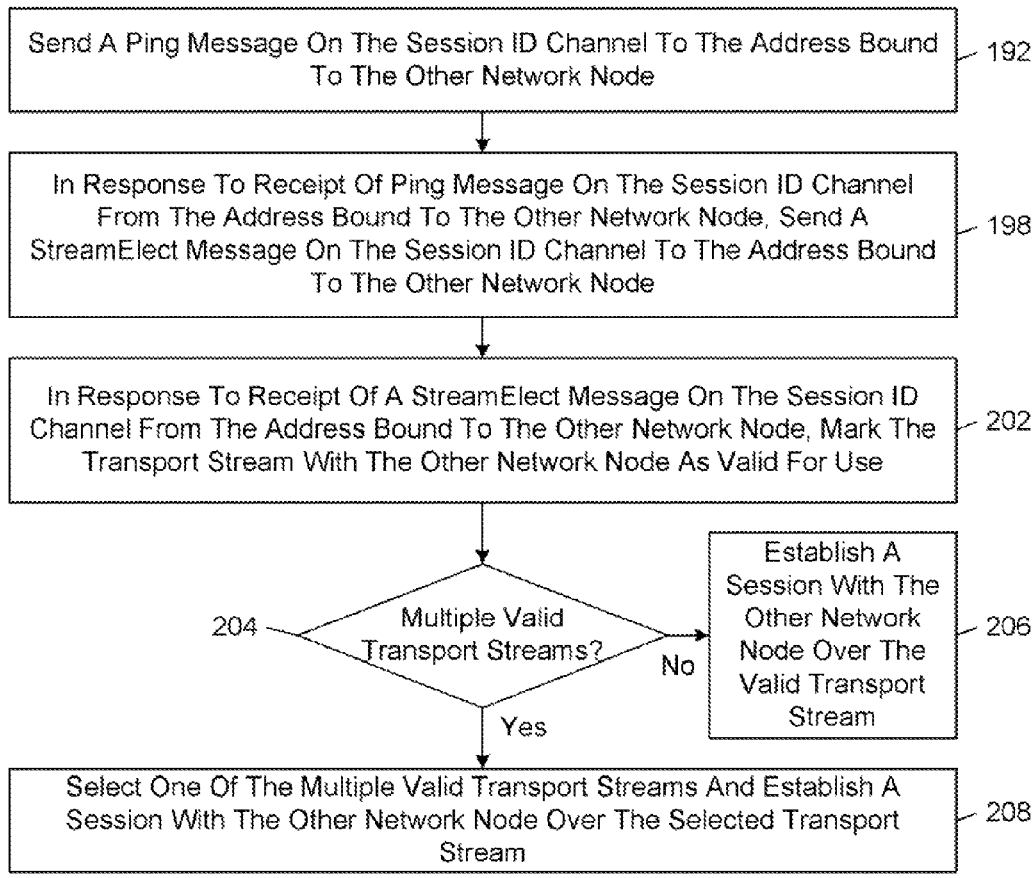
FIG. 13 shows an exemplary embodiment of a method of establishing a session between client network nodes over a transport stream.
Figure 14:
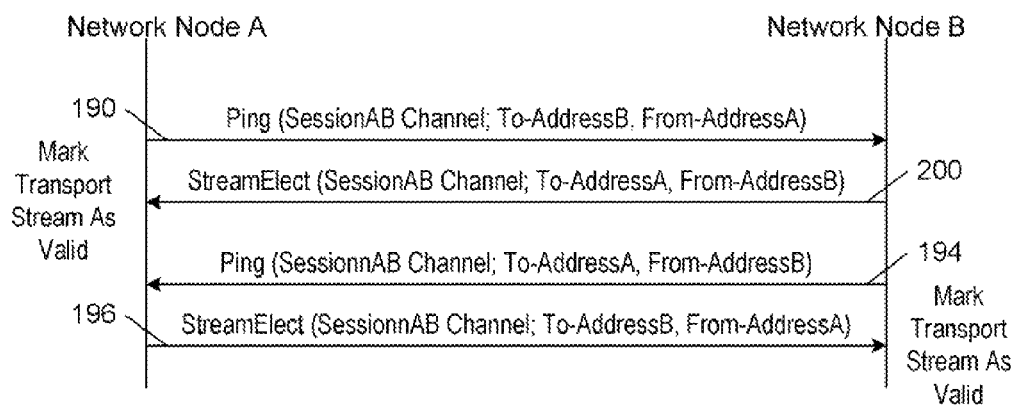
FIG. 14 shows an exemplary interaction diagram that contains a set of exemplary messages that are transmitted between client network nodes in an exemplary embodiment of the method of FIG. 13.

FIG. 13 shows an embodiment of a method by first and second network nodes (e.g., Network Node A and Network Node B) establish a session with each other over a transport stream. FIG. 14 shows an interaction diagram that contains a set of exemplary messages that are transmitted between Network Node A and Network Node B in an exemplary implementation of the method of FIG. 13.

Referring to FIGS. 13 and 14, each network node sends a Ping message (FIG. 14, messages 190 and 194) on the Session ID channel to the address that is bound to the other network node (FIG. 13, block 192). In response to receipt of a Ping message (FIG. 14, messages 194 and 190) on the Session ID channel from the address bound to the other network node, each network node sends a StreamElect message (FIG. 14, messages 196 and 200) on the Session ID channel to the address bound to the other network node (FIG. 13, block 198). In response to receipt of a StreamElect message (FIG. 14, messages 200 and 196) on the Session ID channel from the address bound to the other network node, each network node marks the transport stream with the other network node as valid for use (FIG. 13, block 202). If there is only one valid transport stream (FIG. 13, block 204), each network node establishes a transport stream with the other network node over the valid transport stream (FIG. 13, block 206). If there are multiple valid transport streams (FIG. 13, block 204), each network node selects one of the valid transport stream and establishes a session with the other network node over the selected transport stream (FIG. 13, block 208).

In some embodiments, for each of the session partner client network nodes with which a given client network node has successfully established multiple concurrent network connections with the other client network node, the given client network node maintains one or more or more of the unselected ones of the multiple concurrent network connections with the session partner alive during the session that was established over the selected network connection. In some embodiments, the stream transport service 72 keeps these streams alive by periodically sending Pings (e.g., every three seconds) to the session partner. If a responsive Ping is not received, the stream transport service 72 may, repeat the process of establishing a transport stream with the session partner (see, e.g., FIGS. 13-14). If that process fails, the stream transport service 72 may repeat both the network address resolution process (see, e.g., FIGS. 11-12) followed by the transport stream establishment process (see, e.g., FIGS. 13-14).

In some embodiments, the transport service 72 creates a single protocol socket (e.g., a UDP socket) that is bound to a particular socket address (i.e., a particular IP address and protocol port number) but is not bound to any particular destination address. In this way, transport streams may be created with multiple destination addresses. In embodiments in which the socket protocol port is a UDP/IP protocol port, the transport server sends data over the single protocol port using the "sendto( )" API function, which takes the destination address (i.e., IP address/Protocol Port Number) of the endpoint network node.

The network layer protocol (i.e., IP) maintains a thread that manages a set of buffers for receiving packets at the socket protocol port. When a packet arrives in one of the buffers, the thread checks the packet (e.g., validates the checksum), decrypts the packet if it is encrypted, and if the packet is valid (e.g., the flags, the checksum, and MAC are valid) the thread attempts to match the Channel ID to all a transport service (identified by Transport ID) listed in the channel definition table to determine the one or more target transport service designated to handle transport of that Channel ID. If a target transport service is found, the transport service notifies the stream transport service 72 that the packet has arrived on the channel corresponding to the Channel ID of the packet. The stream transport service 72 determines the Content ID of the packet and sends the packet payload to each of the client processes 74 that subscribed to that Content ID. In this process, the stream transport service 72 posts the payload to a queue and on a thread waiting in the queue. If a target transport service is not found in the channel definition table, the stream transport service 72 attempts to match the Channel ID to entries in the session definition table and the station definition table. If a matching entry is found, the stream transport service 72 processes the packet (e.g., for network address resolution or session maintenance processing). If a target transport service is not found in any of the channel definition table, the session definition table, and the station definition table, the packet is dropped.

Channels are transmitted independently of other channels over the same socket. The loss of any packets in one channel does not affect the integrity of other channels. As explained below, the stream transport service provides a channel-by-channel flow control functionality, where each channel can have different priorities.

4. Session Termination

When a communicant on a given client network node inputs a command to exit a communication session, the stream transport service sends an exit message to the server node. In response to receipt of the exit message, the server node sends to the other client network nodes connected to the server application definition records instructing their respective instances of the stream transport service 72 to tear down their sessions with the given client network node. In response to receipt of these definition records, each of the other client network nodes tears down the session with the given client network node and all the audio and screen share processing components associated with the channels created for communication with the given client network node.

5. Proxy Nodes

In some embodiments, sessions between network nodes are established over network connections that include one or more proxy nodes (also referred to as "proxy relay stations") that are provisioned by the server node 16. A proxy node does not negotiate sessions for itself. Any session negotiation is done end-to-end by the client nodes, with the proxy node simply relaying the messages between the client nodes. Since a proxy node does not participate in session-layer flow control, proxy node transport implementations simply drop session messages until both participants in a session have been heard from. Since neither client node will send any traffic until Ping messages have been exchanged, there is little network traffic over the link.

The server node 16 provisions the client nodes with station definitions of various protocols and priorities such that each client node is capable of communicating P2P with each desired client node through some route. If one or more proxy nodes are available, the server node 16 sends the session definition and station definitions for the proxy nodes to the client nodes 12, 14, where each proxy node station definition includes a Proxy Station ID, a Transport variant ID, and an encryption variant ID. If there are more than one proxy available, the area service chooses the best proxy for the current load and decides where each proxy station routes its traffic, which may be relayed through one or more other proxy stations. In some embodiments, the area service selects a respective route for each session by executing a network traffic balancing process that attempts to minimize bottlenecks in the network based on minimum traffic meshes.

A transport stream between a client node and a proxy node is established using a StreamStats message in the same way that a client node establishes a transport stream with any other node. The proxy node transport implementation negotiates client node links using its own station address. The proxy node may accept and forward messages for any client station that contacts it (promiscuous relay) or it may ignore StreamStats messages on station channels unknown to it (provisioned relay). The provisioning of station definitions for allowed client nodes is done out-of-band. If the link comes up (i.e., a StreamElect message is heard by the client node on a Proxy Station channel from some network address), then the client node binds the proxy node to that network address.

After the proxy node is bound to an address, the client node sends StreamStats messages to the proxy node at 3-second intervals in order to keep the transport stream active. When a Ping is received from a proxy node on the Session Channel, that proxy node is marked Valid for use. When any proxy node is marked Valid, all proxy nodes are examined for priority and the best one is selected for sending subsequent Session messages. A StreamElect message is sent to the selected proxy node on the Session Channel. This selection may change many times over the life of the Session as network connectivity changes and proxy nodes of different priority become available or unavailable.

In these embodiments, the server node 16 provisions a Proxy for a session between two client nodes using an out-of-band ProxySession message that includes the Proxy Station ID of the proxy node and the Session ID that is assigned to the session. Once the proxy node is provisioned, the server node 16 modifies the session definition to include the Proxy Station ID of the proxy node in its list of possible relay stations.

In some embodiments, proxy nodes are provisioned by the server node 16 from a transceiver table in the server database. The list of active proxy nodes is read at server startup, and changes to the transceiver table result in notification events to the server node 16 so that it may add or remove active proxy nodes.

A session between the server node 16 and a proxy node is initiated by the server node 16. The server node 16 first sends a TransceiverSessionStart message containing the server node Station ID and a unique Session ID to the proxy node. If the connection is lost and re-established, the Session ID will change, triggering a clean up phase on the proxy node to remove stale session and channel bindings. When the proxy node receives the TransceiverSessionStart message, it responds with a StreamStats message as described above. Receipt of the StreamStats message causes the server node 16 to activate the proxy node and begin using it for client/server and peer-to-peer sessions as determined by the server node's proxy selection heuristic.

Once a proxy node has become activated, it is informed of previously established session/channel bindings for each selected session. The proxy node is sent a StrawSession message to define the session and the two endpoint client nodes. For each published channel on the session, the proxy node is sent a ChannelBind message which maps a ChannelID to a SessionID. As new sessions are established and proxy nodes are selected, the selected proxy nodes are notified of the new sessions at the same time the client nodes are informed of the sessions. When new channels are published on proxied sessions, ChannelBind messages are sent at the same time the channels are published. When a proxied session ends, the proxy node is notified with two TransceiverSessionStop messages, providing the StationID and SessionID for each client node involved in the session. If the server node 16 needs to disconnect from a proxy node, it sends a TransceiverSessionStop message with the server node 16 StationID and the server/proxy SessionID. This will cause the proxy node to remove all session mappings that were previously provided on that session.

6. Session Maintenance a. Session Protocol Packets

When the SESSIONMAINTENANCE flag in a STRAW packet is set, the packet is a STRAW Session protocol packet, it is unreliable, it is idem-potent, and the packetNum field is not to be interpreted. Examples of STRAW Session protocol packets include Keepalive and ACK.

i. Keepalive Session Protocol

A Keepalive session starts with a normal STRAW Record with Channel ID equal to the Session ID, with the SESSIONMAINTENANCE flag set, a zero Extension Type and Length, and followed by a single SODA Definition data packet with a SODA ID (guidSodaSESSION_KeepAliveAck). When SESSIONMAINTENANCE is set in the Flags field, the NAKED flag filed is assumed to be set (i.e., no Soda Record header will be present).

Referring to FIG. 15, the packet following the STRAW Record is a SODA definition 210 with the normal 128-bit SODA ID and 16-bit length with value 30 and is followed by a 32-bit unsigned ActiveTimeout field, a 32-bit unsigned IdleTimeout field, a 16-bit unsigned SendWindowSize field and a 16-bit unsigned ReceiveWindowSize field. The ActiveTimeout value specifies the maximum number of milliseconds to transpire between ACKs to be transmitted by the receiving station in response to sent STRAW packets, not including STRAW protocol packets. The IdleTimeout value specifies the maximum number of milliseconds to transpire between KeepAlive messages to be transmitted by the receiving station when no STRAW packets other than STRAW protocol packets have been transmitted since the last receiving station transmitted ACK. The SendWindowSize value specifies the maximum number of packets to be transmitted by the receiving station before waiting for this station to transmit an ACK. The ReceiveWindowSize value specifies the minimum number of packets to be received by the receiving station before transmitting an ACK to this station. This value is generally supposed to be smaller than SendWindowSize. In that case a sequence of sent packets is ACK'd before the sender triggers flow control (stops sending), permitting the full bandwidth of a session to be filled without wasting time on protocol.

ii. ACK Session Protocol

The ACK protocol packet begins as a Keepalive packet, but with the SODA length value larger than 30. Following the SodaSESSION_KeepAliveAck SODA definition are a set of SDSESSION_ChannelAck SODA definitions, one for each active reliable channel defined for the Session.

Referring to FIG. 16, each SodaSESSION_KeepAliveAck SODA definition 212 starts with the normal 128-bit SODA ID with value (guidSodaSESSION_ChannelAck) followed by a SODA length field with value 36 or greater. This is followed by a 128-bit Channel ID, a 16-bit PacketNumMax field and zero or more PacketNumMissed fields. The number of PacketNumMissed fields is determined by the SODA length value in excess of 36, divided by two. E.g. if the SODA length value is 40 there are (40−36)/2=2 PacketNumMissed fields present.

b. Flow Control

STRAW Session packet flow is controlled by Keepalive/ACK packets. They are idem-potent unreliable maintenance messages sent on the session channel, and contain ACK interval times, packet window sizes and channel acknowledgments. They are completely responsible for tracking all packet flow on channels on a session.

Keepalive messages are never flow-controlled, They are queued as priority messages (head of the queue) and re-sent periodically in case they were dropped. They are sent in response to inbound flow, more often when packets are flowing, less often when no packets have occurred since the last interval.

These messages pass end-to-end. Therefore, passing through a proxy does not change the messages.

STRAW can be transmitted over any serial channel (e.g., UDP, TCP, HTTP or even PPP). Keepalive messages are used no matter what the channel.

i. ACK Interval Times

There are two intervals sent in each session Keepalive message: cMsActive and cMsIdle. These control the maximum interval between Keepalive messages. When receiving a packet a session becomes Active, and Keepalive messages are sent at least as often as cMsActive. When no packets were received between one sent Keepalive and the next, the session becomes Idle and subsequent Keepalive messages are sent at least as often as cMsIdle. If a packet is received during this Idle interval, the session resumes the Active state.

Normally these intervals are not changed from message to message—yet each time a Keepalive is received, the intervals should be taken as new values.

A special case exists when both intervals are zero. This marks the Keepalive message as a "reiterate request". A station transmits this message when its specified interval (the one it sends) has expired yet no Keepalive was received from the partner station. A station that receives a reiterate is expected to immediately send a Keepalive with acknowledgments for all subscribed channels. A station may attempt several reiterates, and if nothing is received for several ack intervals then the session may be considered lost.

A reiterate can also be sent when flow control has shut down a channel for an extended period. This can happen when a Keepalive is dropped (remember they are unreliable), and the dropped Keepalive contained a channel acknowledgment not present in subsequent Keepalives.

Figure 17:
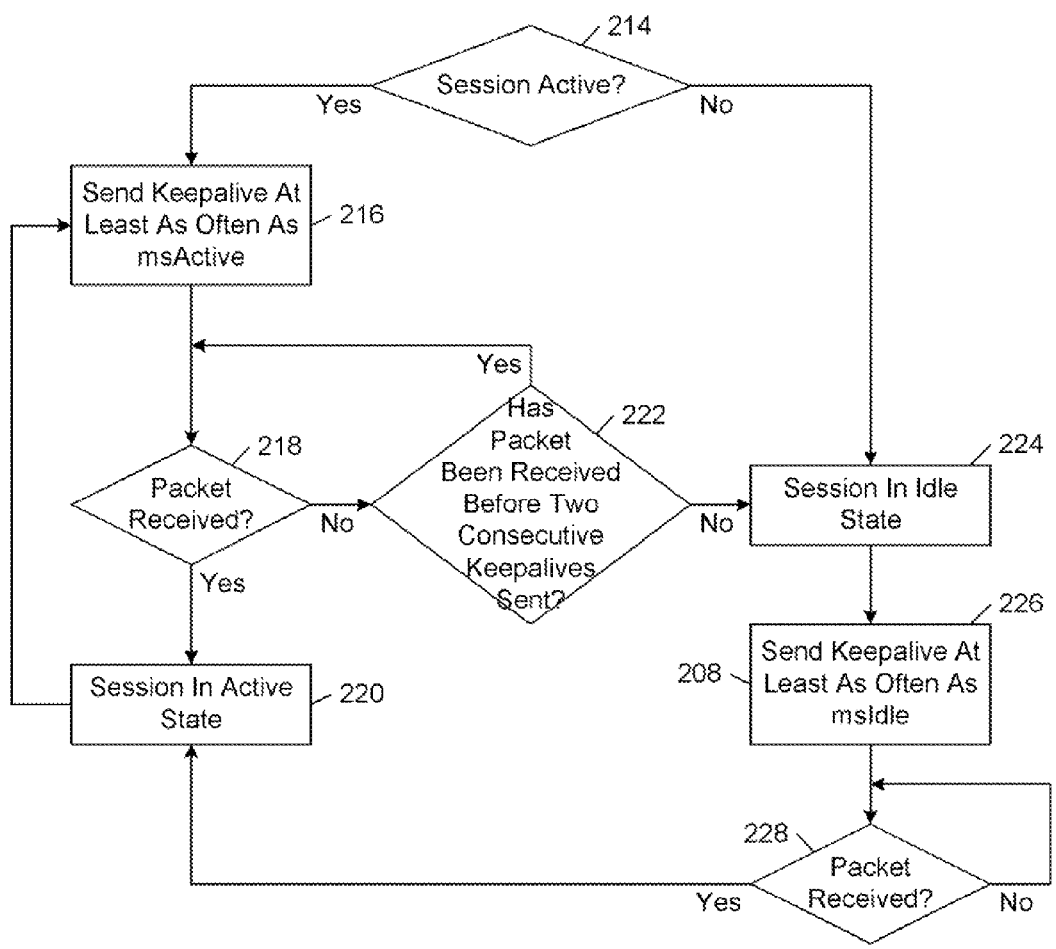
FIG. 17 shows an exemplary embodiment of a method of controlling the flow of acknowledgement messages.

FIG. 17 shows an embodiment of a method that is implemented by an embodiment of the stream transport service 72 in controlling the flow of acknowledgement messages.

In accordance with the method of FIG. 17, if a session is active (FIG. 17, block 214), the stream transport service 72 sends Keepalive messages at least as often as the msActive parameter value specified in the last Keepalive value received from the session partner node (FIG. 17, block 216). When a packet is received (FIG. 17, block 218), the session is in an active state (FIG. 17, block 220) and the stream transport service 72 sends Keepalive messages at least as often as the msActive parameter value specified in the last Keepalive value received from the session partner node (FIG. 17, block 216). If a packet is not received (FIG. 17, block 218), the stream transport service 72 determines if a packet has been received from the session partner node before two consecutive Keepalive messages were sent (FIG. 17, block 222). If two consecutive Keepalive messages were not sent since the last packet was from the session partner node (FIG. 17, block 222), then the stream transport service 72 continues to wait for a packet to be received (FIG. 17, block 218).

If two consecutive Keepalive messages were not sent since the last packet was from the session partner node (FIG. 17, block 222), then the stream transport service 72 sets the session in the idle state (FIG. 17, block 224). If the session is in the idle state (FIG. 17, block 224), the stream transport service 72 sends Keepalive messages at least as often as the msIde parameter value specified in the last Keepalive value received from the session partner node (FIG. 17, block 226). When a packet is received (FIG. 17, block 228), the session is in an active state (FIG. 17, block 220) and the stream transport service 72 sends Keepalive messages at least as often as the msActive parameter value specified in the last Keepalive value received from the session partner node (FIG. 17, block 216).

ii. Window Sizes

There are two window sizes sent in each session Keepalive message: sSendWindow and sRcvWindow. These are not a pair, they control flow for two different streams. The send window limits unacked inbound packets. The receive window limits un-ACK'd outbound packets.

Given two partners P1 and P2 each sending window sizes to one another, call them P1.send, P1.rcv, P2.send and P2.rcv. From the point of view of P1 there are two streams, SOut and SIn.

The stream P1.SOut is controlled by P2.send and P1.rcv. Session partner node P1 will send up to P2.send un-Ack'd packets before blocking the stream. P2 will ACK the stream when it has received P1.rcv packets since the last time it ACK'd. Normally P1.rcv is calculated from P2.send, and is smaller. It may be set at half of P2.send, and adjust up a little if P1 hasn't had to block the stream in a while, down a little each time it has to block. This controls the number and frequency of P2 ACKs to a reasonable level and keeps the stream flowing as fast as the network will bear.

The stream P1.SIn is controlled by P1.send and P2.rcv. Session partner node P2 will send up to P1.send un-ACK'd packets before blocking the stream. P1 will ACK the stream when it has received P2.rcv packets since the last time it ACK'd. Normally P1.send is set to a nominal value (10 or so), and adjusted down a bunch if we are seeing skipped packet numbers (dropped packets due to congestion). It can be adjusted up slowly if the stream transport service is not seeing retransmissions.

Figure 18A:
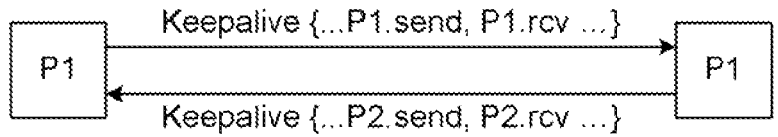
FIG. 18A shows an exemplary exchange of Keepalive messages between session partner nodes in accordance with an embodiment of the invention.
Figure 18B:
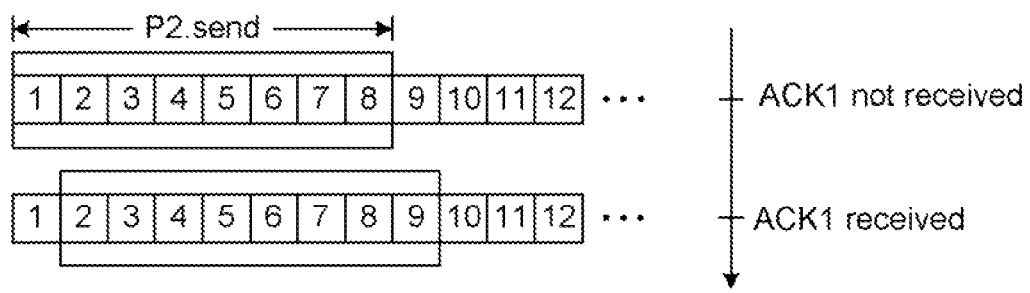
FIG. 18B shows an exemplary flow of packets from session partner node in accordance with an embodiment of the invention.
Figure 18C:
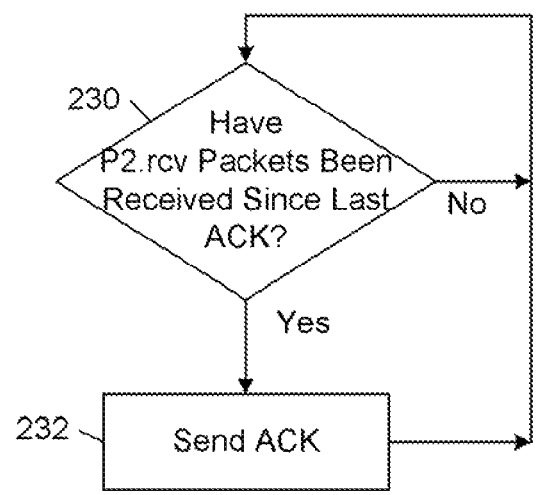
FIG. 18C shows an exemplary embodiment of a method of acknowledging receipt of packets from session partner node.

FIGS. 18A-18C illustrate an embodiment of a method that is implemented by an embodiment of the stream transport service 72 in controlling the flow of packets between the session partner nodes P1 and P2.

FIG. 18A shows the exchange of Keepalive messages between the session partner nodes P1 and P2, where the Keepalive message sent by session partner node P1 contains the windows sizes P1.send and P1.rcv, and the Keepalive message sent by session partner node P1 contains the windows sizes P2.send and P2.rcv.

FIG. 18B shows the flow of packets from session partner node P1. The flow of packets sent by session partner node P1 is controlled by the window sizes P2.send and P1.rcv. In the illustrated example, the P2.second window size is set by the session partner P2 to be eight packets. Therefore, the session partner node P1 will send up to eight un-Ack'd packets before blocking the stream. When an acknowledgement for packet 1 is received from the session partner node P2, the P2.send window slides so that the session partner node P1 can send packet 9.

FIG. 18C shows an embodiment of a method by which the stream transport service 72 operating on the session partner node P1 acknowledges receipt of packets from session partner node P2. In accordance with this method, if P2.rcv packets have been received from the session partner node P2 since the last acknowledgement message was sent by the session partner node P1 (FIG. 18C, block 230), the session partner node P1 sends an acknowledgement message to the session partner node P2. Otherwise, the session partner node P1 waits until P2.rcv packets have been received from the session partner node P2 since the last acknowledgement message was sent by the session partner node P1 (FIG. 18C, block 230).

7. Channel Protocols i. Unreliable Channel Protocol

Packets sent over a Channel defined as Unreliable (lacking the Reliable bit in their Channel Definition) are not ever retransmitted. Their STRAW Record header is the same as packets send over a Reliable Channel, and STRAW calculates all header fields identically including an incrementing PacketNumber value and calculated MAC value. But in the event an arriving packet has an incorrect MAC value or skips the next expected PacketNumber value, the only result is that STRAW reports to local Services that Subscribe to that Channel that a packet was missed. It is up to the Service to respond appropriately (e.g., using their own application-layer signaling or synthesizing the missing data by filtering audio data to conceal the missing audio values).

ii. Reliable Channel Protocol

Packets sent over a Channel defined as Reliable (having the Reliable bit in their Channel Definition) are retransmitted until acknowledged. Reliability is achieved through the STRAW Record PacketNumber field combined with received ACK Session Protocol packets.

In some embodiments, the stream transport service 72 sends packets reliably as follows. The stream transport service 72 transmits queued packets until the count of un-ACK'd packets sent exceeds SendWindowSize. A sent packet is retained by the stream transport service 72 until ACK'd. A received ACK acknowledges receipt of a numbered packet when the ACK contains a SodaSESSION_KeepAliveAck record with a Channel ID that matches the packet's Channel, with a PacketNumMax value that meets or exceeds the packet's PacketNumber, AND the packet's PacketNumber is NOT represented in any PacketNumMissed value. Once ACK'd, the stream transport service resources for the sent packet are freed.

The stream transport service 72 resends un-ACK'd packets when it receives any SodaSESSION_KeepAliveAck message that lists the PacketNumber in a PacketNumMissed field, OR when it receives two (2) ACKs for the channel that have PacketNumMax value below the sent packet's PacketNumber.

If the stream transport service 72 stalls with un-ACK'd packets (e.g., no received channel ACK within ActiveTimeout value*2 ms), it may send a special premature Keepalive with an ActiveTimeout value of zero (0) and an IdleTimeout value of zero (0). This message is called a "reiterate request". This indicates to the Partner Station that it must immediately ACK all Channels, whether active or idle. This special all-channel ACK is called a "reiterate message".

Reiterate recovers from a missed ACK packet. Since ACK packets are idem-potent, the Sender and Receiver will be in sync after receipt of the Reiterate. STRAW sends Reiterate Requests at the ActiveTimeout interval until an ACK message is received, or its patience is exceeded and the Session is brought down (unbound).

Figure 19:
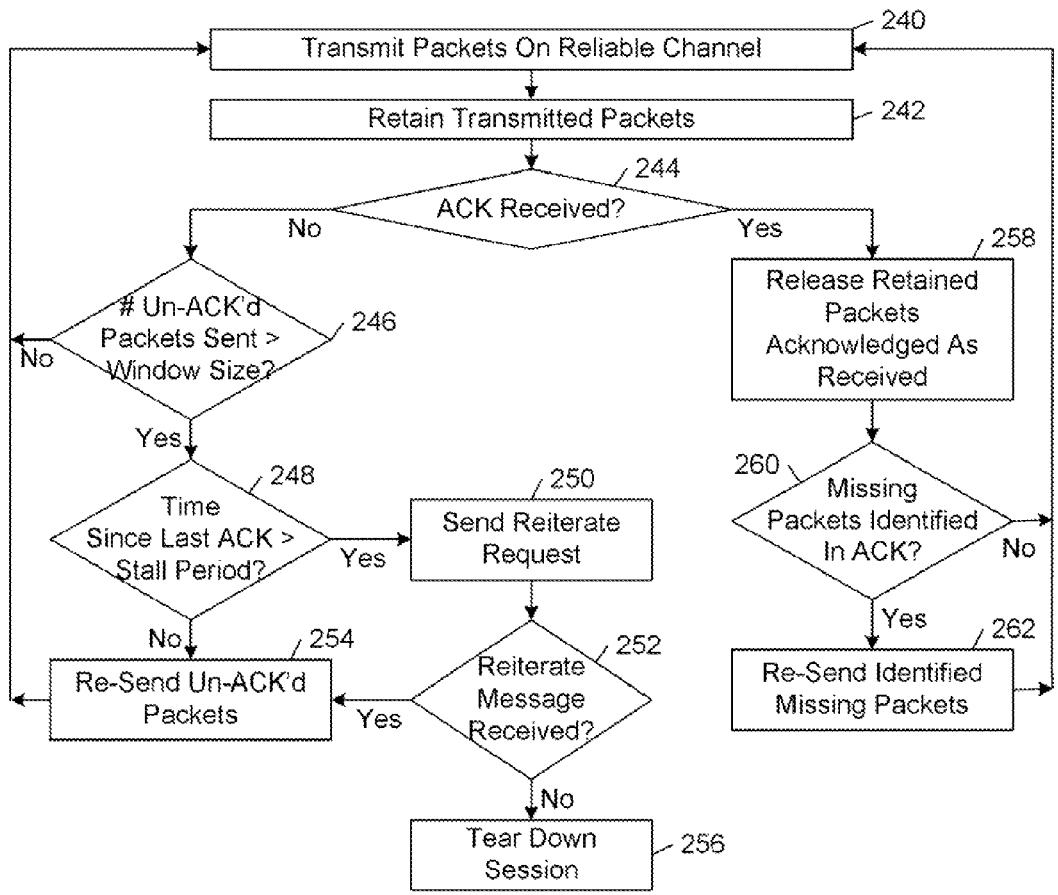
FIG. 19 shows an exemplary embodiment of a method of sending packets on a reliable channel in a session.

FIG. 19 shows an embodiment by which the stream transport service 72 sends packets on a reliable channel in a session with a session partner node.

In accordance with the method of FIG. 19, the stream transport service 72 transmits packets on the reliable channel (FIG. 19, block 240). The stream transport service 72 retains copies of the transmitted packets (FIG. 19, block 242).

If an ACK was not received (FIG. 19, block 244), the stream transport service 72 continues to transmit packets until the number of un-ACK'd packet exceeds the SendWindowSize parameter value (FIG. 19, block 246). If the number of un-ACK'd packet exceeds the SendWindowSize parameter value (FIG. 19, block 246), the stream transport service 72 determines whether or not the time since the last ACK was received is greater than the stall period (e.g., ActiveTimeout value*2 ms) (FIG. 19, block 248). If the time since the last ACK was received is greater than the stall period (FIG. 19, block 248), the stream transport service 72 sends a reiterate request to the session partner node (FIG. 19, block 250). If a reiterate message is received from the session partner node in response to the reiterate request (FIG. 19, block 252), the stream transport service 72 re-sends un-ACK'd packets (FIG. 19, block 254) and continues to transmit packets on the reliable channel (FIG. 19, block 240); otherwise, the stream transport service 72 tears down the session (FIG. 19, block 256). If the time since the last ACK was received is less than or equal to the stall period (FIG. 19, block 248), the stream transport service 72 re-sends un-ACK'd packets (FIG. 19, block 254) and continues to transmit packets on the reliable channel (FIG. 19, block 240).

If an ACK is received (FIG. 19, block 244), the stream transport service 72 releases the retained packets that were acknowledged as having been received by the session partner node (FIG. 19, block 258). If there are any missing packets identified in the ACK (FIG. 19, block 260), the stream transport service 72 re-sends the identified missing packets (FIG. 19, block 262).

In some embodiments, the stream transport service 72 operating on the sender and receiver network nodes use the cookie field in the STRAW record 102 (see FIG. 5) in order to optimize the resending of packets by the sender network node. In these embodiments, the sender network node sends a unique session-level cookie value in the cookie field of the STRAW record sent with each packet. The sender network node stores an ordered list of the cookie values in a data structure (e.g., a table 168). The receiver network node sends with each acknowledgement packet (ACK) the cookie value of the last packet processed by the receiving network node in the cookie field of the STRAW record send with the ACK packet. As in the embodiments described above, each ACK packet also includes a maximum packet number received value and packet numbers of missed packets in the in the PacketNumMax and the PacketNumMissed fields of the ACK SODA definition sent with the ACK packet (see FIG. 16). Upon receipt of an ACK packet, the sending network node extracts the cookie value of the last packet processed by the receiving network node. The sender network node uses this information in block 246 of the method shown in FIG. 19. In particular, the sender network node does not include in the count of un-ACK'd packets (see FIG. 19, block 246) any packets with cookie values that were sent after the extracted cookie value. In this way, the sender network node avoids re-sending packets that were received by the receiver network node but have not yet been processed as a result of unavoidable latency in the processing of received packets.

The cookie value can be any type of data that uniquely identifies the packet during a session (e.g., a timestamp value or a non-repeating counter value). As explained above, a packet number is a number in a unique repeating sequence of numbers that is assigned to the packets in a respective channel. Since ACK'ing occurs at the session-level (for all channels), the cookie provides additional information that the channel-level packet numbers alone do not since the cookie is a marker within the entire packet stream while packet numbers are markers within each channel's packet stream.

Figure 20:
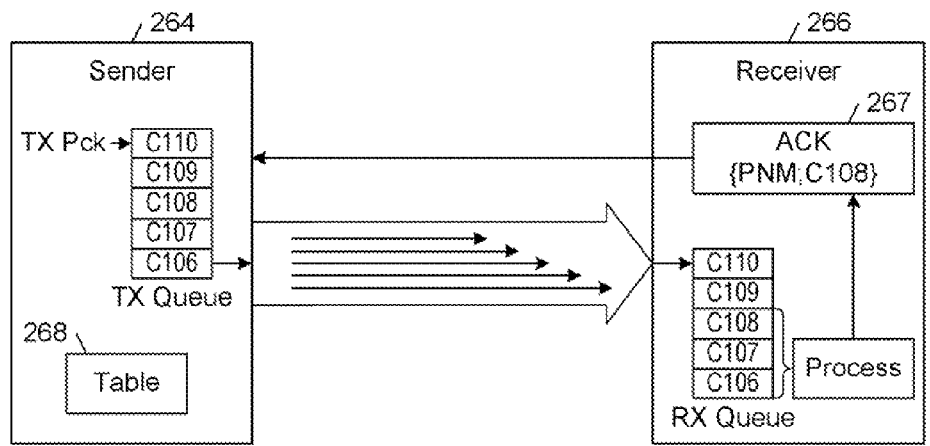
FIG. 20 shows an exemplary embodiment of a method of sending packets by a sender node and acknowledging received packets by a receiver node in accordance with an embodiment of the invention.

FIG. 20 shows an exemplary embodiment of a method of sending packets by a sender node 264 and acknowledging received packets by a receiver node 266 in accordance with the embodiments described in the preceding paragraph. In this example, the sender network node 264 sends a sequence of packets with respective unique cookie values C106, C107, C108 from its transmission queue (TX Queue) to the receiver network node 266. The receiver network node 266 receives the sent packets in its receipt queue (RX Queue) and begins processing the packets in the RX Queue. After processing the packet with cookie value C108, the receiver network node 266 sends to the sender network node an ACK packet 267 that contains the highest packet number received value (PNM, PacketNumMax) and the cookie value C108, which was extracted from the packet received from the sender network node. Before receiving the ACK packet 267, the sender network node sends a sequence of packets with respective unique cookie values C109 and C110 from its transmission queue (TX Queue) to the receiver network node 266. When the sender network node receives the ACK packet 267, the sender network node frees up resources based on the highest packet number received value as described above. The sender network node also looks up the cookie value C108 in the table to determine the last packet processed by the receiver network node. The sender network node does not include in the count of un-ACK'd packets (see FIG. 19, block 246) any packets with cookie values that were sent after cookie value C108.

If the receiver network node missed a non-ACK packet and it was the last in a series, it may mark the session idle, and the sender network node may not see another ACK from the receiver network node for several seconds. However, this scenario does not lead to a dropped packet. In particular, in accordance with the method of FIG. 19, when the sender network node currently has the session set in the active state yet does not receive an ACK for longer than the stall period (see FIG. 19, block 248), the sender network node issues a REITERATE message (FIG. 19, block 250), causing my receiver network node to immediately send a complete ACK. The sender network node treats the cookie value in the ACK sent in response to the REITERATE message as current and, if it doesn't cover the last packets sent to the receiver network node, the sender network node marks these last packets sent as missed packets and re-sends them (FIG. 19, block 254).

In some embodiments, the stream transport service 72 receives packets reliably as follows. The stream transport service 72 starts a Session ACK timer for last received ActiveTimeout value upon receiving a non-protocol packet, if the timer was not already started. When the timer expires, the stream transport service 72 sends an ACK containing SodaSESSION_KeepAliveAck records for all channels that are active (had a packet received since the last ACK). Then if any packets were received since the timer was started, the timer is reset to the ActiveTimeout value, else it is set to the IdleTimeout value. The stream transport service 72 sends an ACK when any packet is received out-of-order. The stream transport service 72 sends an ACK when the ReceiveWindowSize is reached, that is when a received PacketNum is greater than the last ACK'd PacketNum by ReceiveWindowSize. The stream transport service 72 sends an ACK when the Session is bound. The stream transport service 72 sends an ACK when a Reiterate Request is received. When any ACK is sent, all active Channels (or all Channels if the Session has received a reiterate request) are represented with SodaSESSION_KeepAliveAck records. When a duplicate message is received (one with a PacketNumber that was already ACK'd on that Channel), the stream transport service 72 marks the session for Reiteration on the next ACK.

Figure 21:
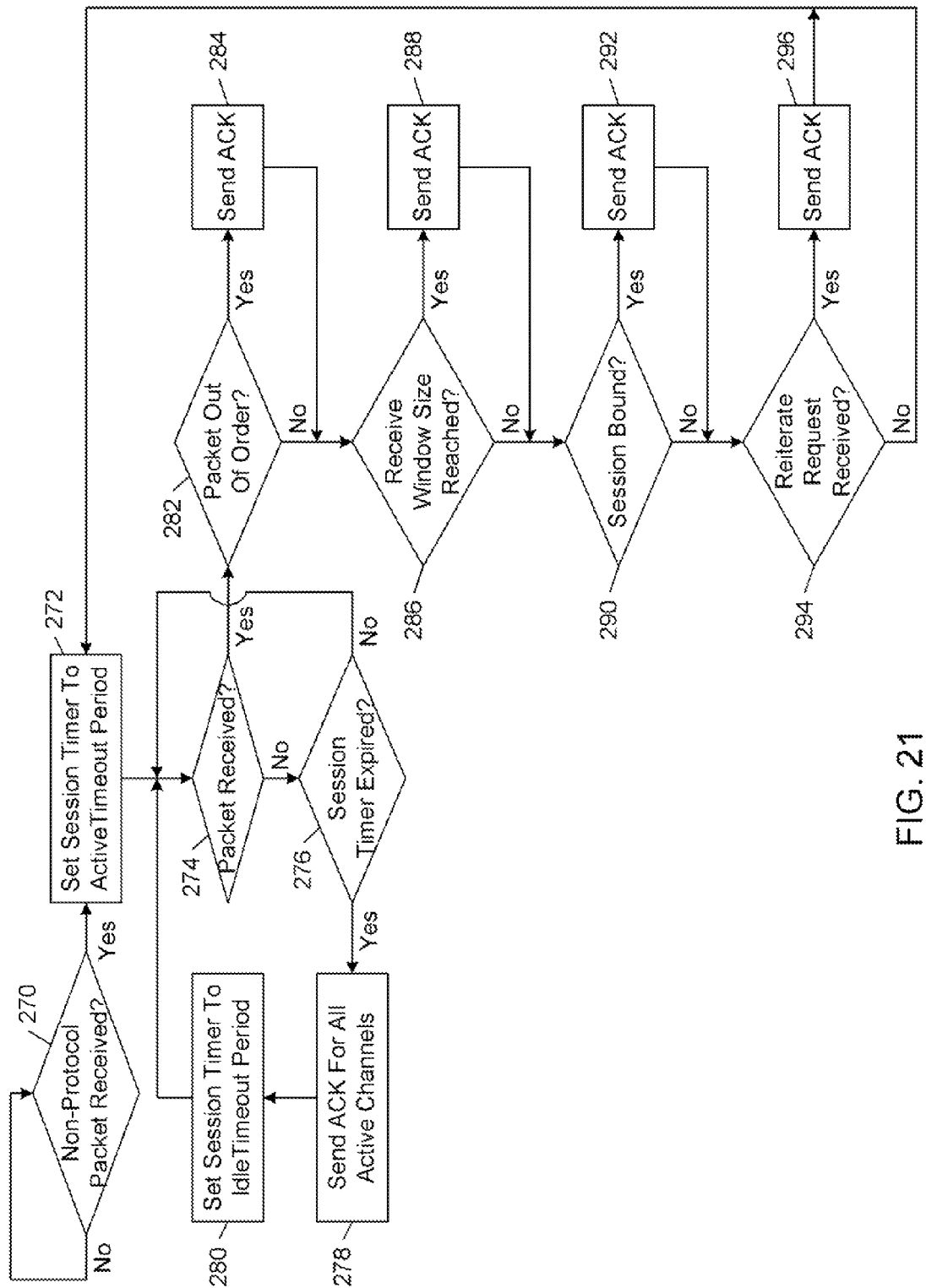
FIG. 21 shows an exemplary embodiment of a method of receiving packets on a reliable channel in a session.

FIG. 21 shows an embodiment by which the stream transport service 72 receives packets on a reliable channel in a session with a session partner node.

In accordance with the method of FIG. 21, in response to receipt of a non-protocol packet (FIG. 21, block 270), the stream transport service 72 sets the session timer to the last ActiveTimeout period received from the session partner node (FIG. 21, block 272). The stream transport service 72 then waits for the next packet to be received (FIG. 21, block 274). If a packet has not been received before the expiration of the session time (FIG. 21, block 276), the stream transport service 72 sends an ACK for all active channels (FIG. 21, block 278) and sets the session time to the IdleTimeout period (FIG. 21, block 280). If a packet has been received before the expiration of the session time (FIG. 21, block 276), the stream transport service 72: sends an ACK if the received packet is out of order (FIG. 21, blocks 282, 284), if the received packet causes the ReceiveWindowSize to be reached (FIG. 21, blocks 286, 288), if the received packet binds the session (FIG. 21, blocks 290, 292), or if the received packet is a reiterate request message (FIG. 21, blocks 294, 296).

8. Protocol Extensions

In some embodiments, the stream transport protocol includes the following extensions: SINGLETON and MULTI. Almost all packets are sent SINGLETON, with an Extension Type of zero and an Extension Length of zero. These packets are processed immediately upon receipt. Packets sent MULTI are intended for transmitting oversize records, that is records larger than the UDP payload permits. The data payload of such packets is simply appended in PacketNumber order, and processed as a single data packet once all STRAW packets in the sequence are received. If MULTI is used on an unreliable Channel, then missing one packet in the MULTI sequence results in all of the packets in the sequence being discarded and reported to Subscribed Services as "missed".

V. EXEMPLARY APPLICATION ENVIRONMENTS

A. Introduction

The stream transport protocol supports a variety of different application environments of the platform provided by the communications applications 28, 32 and the server node 16.

Some exemplary embodiments apply one or more of the spatial metaphor visualizations on top of realtime chat interactions. These visualizations provide a context for depicting the current communication states of the communicants involved in realtime chat interactions. The spatial metaphor also provides a context for organizing the presentation of various interface elements that are used by communicants to participate in realtime chat interactions. The spatial metaphor visualizations may be applied to any type of instant messaging platform that provides realtime text-based communication between two or more communicants over the internet or some form of internal network/intranet, optionally with one or more other realtime communication channels, such as audio, video, file share, and application sharing channels. For example, embodiments may be integrated with any of the currently available instant messaging platforms including, for example, AOL Instant Messenger, MSN Messenger, Yahoo! Messenger, Google Talk, and Skype.

Figure 22:
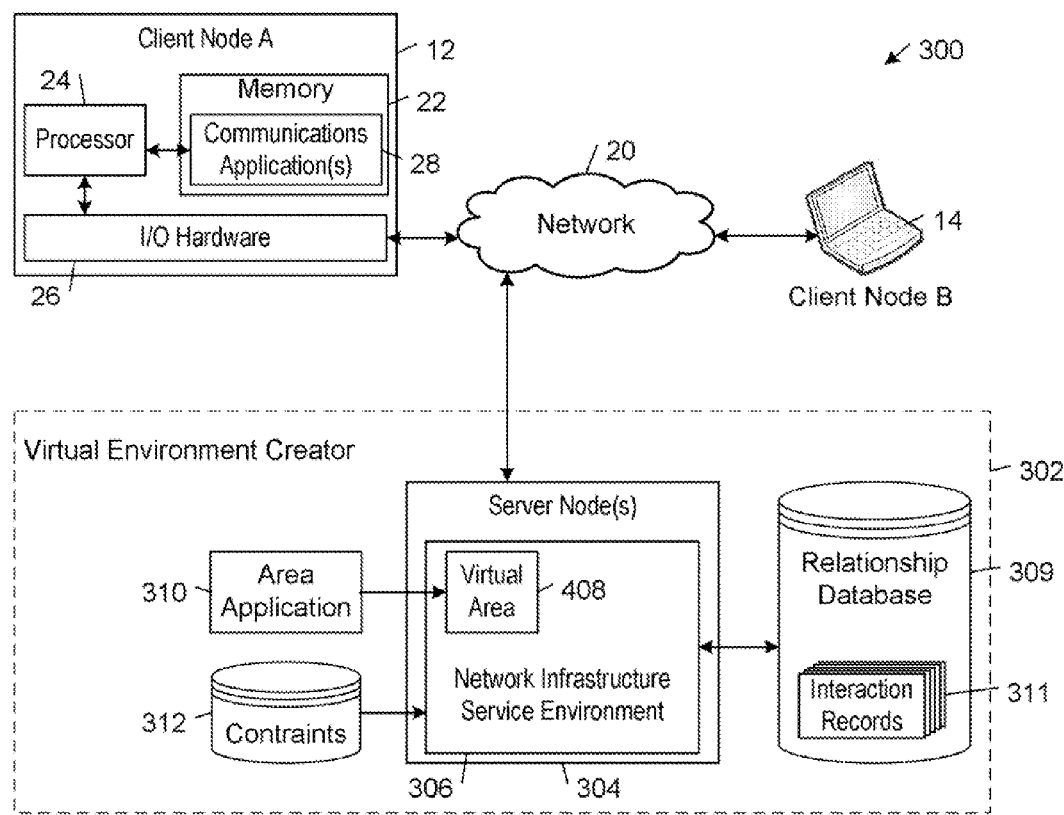
FIG. 22 shows an exemplary embodiment of a network communication environment.

FIG. 22 shows an embodiment 300 of the network communication environment 10 (see FIG. 1) in which the server node 20 is implemented by a virtual environment creator 302. The virtual environment creator 302 includes at least one server network node 304 that provides a network infrastructure service environment 306. The communications application 28, 32 and the network infrastructure service environment 306 together provide a platform for creating a spatial virtual communication environment (also referred to herein simply as a "virtual environment") that includes one or more of the spatial metaphor visualizations described above.

The network infrastructure service environment 306 manages sessions of the first and second client nodes 12, 14 in a virtual area 308 in accordance with a virtual area application 310. The virtual area application 310 is hosted by the virtual area 308 and includes a description of the virtual area 308. The communications applications 26 operating on the first and second client network nodes 12, 14 present respective views of the virtual area 308 in accordance with data received from the network infrastructure service environment 306 and provide respective interfaces for receiving commands from the communicants and providing a spatial interface that enhances the realtime communications between the communicants as described above. The communicants typically are represented in the virtual area 308 by respective avatars, which typically move about the virtual area 308 in response to commands that are input by the communicants at their respective network nodes. Each communicant's view of the virtual area 308 typically is presented from the perspective of the communicant's avatar, which increases the level of immersion experienced by the communicant. Each communicant typically is able to view any part of the virtual area 308 around his or her avatar. In some embodiments, the communications applications 28, 32 establish realtime data stream connections between the first and second client network nodes 12, 14 and other network nodes sharing the virtual area 308 based on the positions of the communicants' avatars in the virtual area 308.

The network infrastructure service environment 306 also maintains a relationship database 309 that contains the records 311 of interactions between communicants. Each interaction record 311 describes the context of an interaction between a pair of communicants.

B. Network Infrastructure Services

The network infrastructure service environment 306 typically includes one or more network infrastructure services that cooperate with the communications applications 28, 32 in the process of establishing and administering network connections between the client nodes 12, 14 and other network nodes (see FIGS. 1 and 22). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 306 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 300.

Area Service

The area service administers virtual areas. In some embodiments, the area service remotely configures the communications applications 28, 32 operating on the first and second client network nodes 12, 14 in accordance with the virtual area application 308 subject to a set of constraints 312 (see FIG. 22). The constraints 312 typically include controls on access to the virtual area. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area subject to the capabilities of the requesting entities, maintains global state information for the virtual area, and serves as a data server for the client network nodes participating in a shared communication session in a context defined by the virtual area 308. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 308 on the client network node in accordance with the virtual area application 310. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

Interaction Service

The interaction service maintains the relationship database 36 that contains the records 311 of interactions between communicants. For every interaction between communicants, one or more services of the network infrastructure service environment 306 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared.

The interaction service also supports queries on the relationship database 36 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database 309 can be combined with other searches. For example, queries on the relationship database may be combined with queries on contact history data generated for interactions with contacts using a communication system (e.g., Skype, Facebook, and Flickr) that is outside the domain of the network infrastructure service environment 306.

C. Virtual Areas

The communications application 28, 32 and the network infrastructure service environment 306 typically administer the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars (e.g., sprites) in a virtual area that has an associated visualization. The avatars move about the virtual area in response to commands that are input by the communicants at their respective network nodes. In some embodiments, the communicant's view of a virtual area instance typically is presented from the perspective of the communicant's avatar, and each communicant typically is able to view any part of the visual virtual area around his or her avatar, increasing the level of immersion that is experienced by the communicant.

A virtual area typically includes one or more zones that are associated with respective rules that govern the switching of realtime data streams between the network nodes that are represented by the avatars in the virtual area. The switching rules dictate how local connection processes executing on each of the network nodes establishes communications with the other network nodes based on the locations of the communicants' avatars in the zones of the virtual area. A virtual area typically is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area are described in accordance with the COLLADA—Digital Asset Schema Release 1.4.1 Apr. 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application No. 61/042,714 (which was filed on Apr. 4, 2008), Ser. No. 11/923,629 (which was filed on Oct. 24, 2007), and Ser. No. 11/923,634 (which was filed on Oct. 24, 2007).

D. Communications Application

In some embodiments, the communications application 26 includes:
  a. local Human Interface Devices (HIDs) and audio playback devices;
  b. a So3D graphical display, avatar, and physics engine;
  c. a system database and storage facility.

Local Human Interface Devices (HIDs) and Audio Playback Devices

The local HIDs enable a communicant to input commands and other signals into the client network node while participating in a virtual area communications session. Exemplary HIDs include a computer keyboard, a computer mouse, a touch screen display, and a microphone.

The audio playback devices enable a communicant to playback audio signals that are received during a virtual area communications session. Exemplary audio playback devices include audio processing hardware (e.g., a sound card) for manipulating (e.g., mixing and applying special effects) audio signals, and speakers for outputting sounds.

So3D Graphical Display, Avatar, and Physics Engine

The So3D engine is a three-dimensional visualization engine that controls the presentation of a respective view of a virtual area and objects in the virtual area on a display monitor. The So3D engine typically interfaces with a graphical user interface driver and the HID devices to present the views of the virtual area and to allow the communicant to control the operation of the communications application 26.

In some embodiments, the So3D engine receives graphics rendering instructions from the area service. The So3D engine also may read a local communicant avatar database that contains images needed for rendering the communicant's avatar in the virtual area. Based on this information, the So3D engine generates a visual representation (i.e., an image) of the virtual area and the objects in the virtual area from the point of view (position and orientation) of the communicant's avatar in the virtual area. The visual representation typically is passed to the graphics rendering components of the operating system, which drive the graphics rendering hardware to render the visual representation of the virtual area on the client network node.

The communicant can control the presented view of the virtual area by inputting view control commands via a HID device (e.g., a computer mouse). The So3D engine updates the view of the virtual area in accordance with the view control commands. The So3D engine also updates the graphic representation of the virtual area on the display monitor in accordance with updated object position information received from the area service.

E. System Database and Storage Facility

The system database and storage facility stores various kinds of information that is used by the platform. Exemplary information that typically is stored by the storage facility includes the presence database, the relationship database, an avatar database, a real user id (RUID) database, an art cache database, and an area application database. This information may be stored on a single network node or it may be distributed across multiple network nodes.

F. Client Node Architecture

Figure 23:
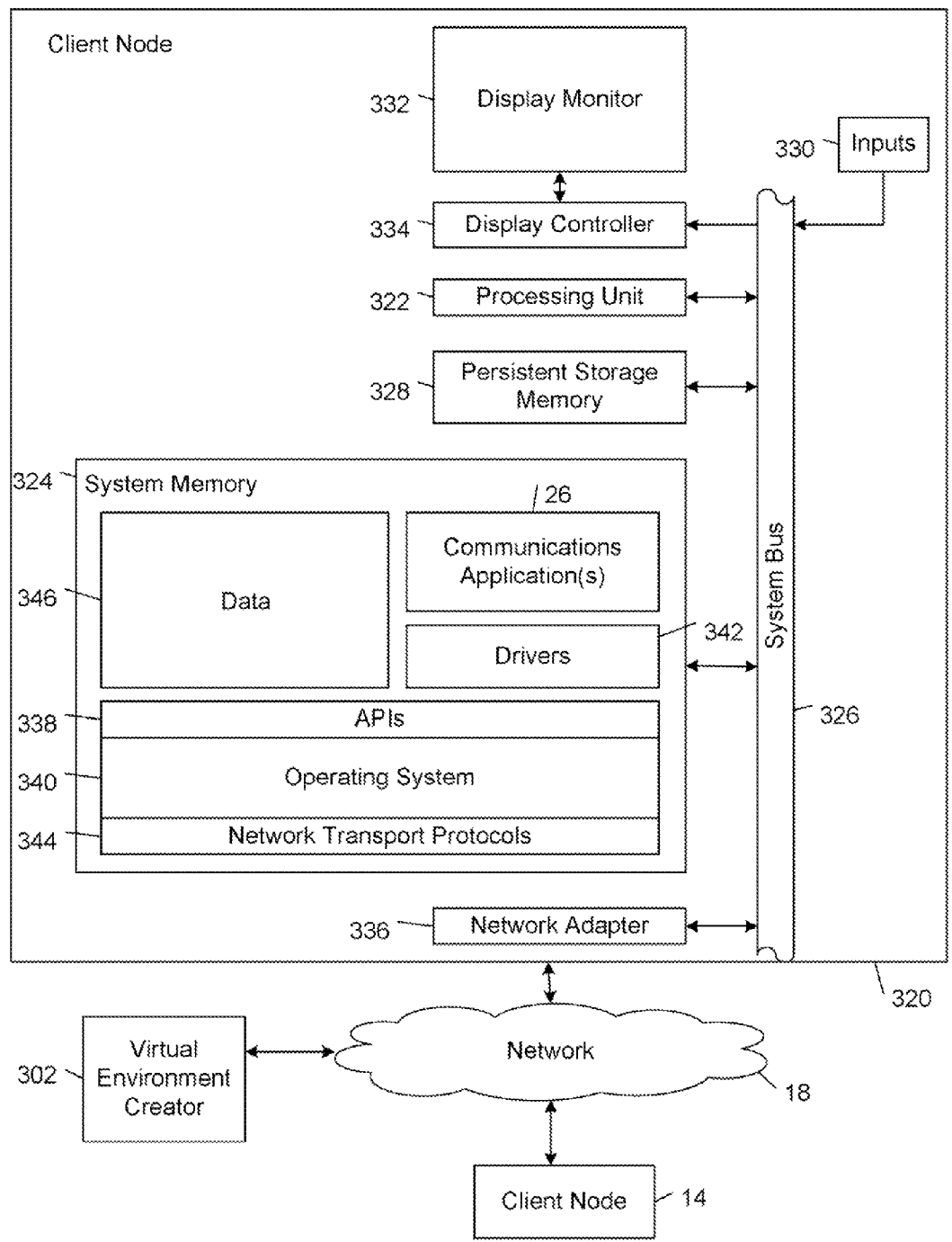
FIG. 23 shows an exemplary embodiment of a client network node.

A communicant typically connects to the network 20 from a client network node. The client network node typically is implemented by a general-purpose computer system or a dedicated communications computer system (or "console", such as a network-enabled video game console). The client network node executes communications processes that establish realtime data stream connections with other network nodes and typically executes visualization rendering processes that present a view of each virtual area entered by the communicant:

FIG. 23 shows an embodiment of a client network node that is implemented by a computer system 320. The computer system 320 includes a processing unit 322, a system memory 324, and a system bus 326 that couples the processing unit 322 to the various components of the computer system 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains startup routines for the computer system 320, and a random access memory (RAM). The system bus 326 may be a memory bus, a peripheral bus or a local bus, and may be compatible with any of a variety of bus protocols, including PCI, VESA, Microchannel, ISA, and EISA. The computer system 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A communicant may interact (e.g., input commands or data) with the computer system 320 using one or more input devices 330 (e.g. one or more keyboards, computer mice, microphones, cameras, joysticks, physical motion sensors such Wii input devices, and touch pads). Information may be presented through a graphical user interface (GUI) that is presented to the communicant on a display monitor 332, which is controlled by a display controller 334. The computer system 320 also may include other input/output hardware (e.g., peripheral output devices, such as speakers and a printer). The computer system 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows XP® operating system available from Microsoft Corporation of Redmond, Wash. U.S.A.), the communications application 26, drivers 342 (e.g., a GUI driver), network transport protocols 344, and data 346 (e.g., input data, output data, program data, a registry, and configuration settings).

G. Server Node Architecture

In some embodiments, the one or more server network nodes of the virtual environment creator 16 are implemented by respective general-purpose computer systems of the same type as the client network node 320, except that each server network node typically includes one or more server software applications.

In other embodiments, the one or more server network nodes of the virtual environment creator 302 are implemented by respective network devices that perform edge services (e.g., routing and switching).

VI. CONCLUSION

The embodiments that are described herein provide a stream transport protocol that supports realtime network communications between communicants operating on respective network nodes. The stream transport protocol has relatively low computational resource requirements so that realtime communications performance can be achieved using a wide range of computing devices and network connections that currently are available.

Other embodiments are within the scope of the claims.

The invention claimed is:

1. A method, comprising by a server network node:
   determining one or more pairs of client network nodes that are connected to a server application hosted by the server network node, wherein the constituent client network nodes of each of the pairs have one or more active sets of complementary sources and sinks of respective data stream content types; and
   for each of the determined pairs of client network nodes, sending to each of the constituent client network nodes of the pair a respective session definition defining a respective peer-to-peer session over a network connection between the constituent client network nodes of the pair;
   establishing a respective server session with each of the client network nodes connected to the server application; and
   over each of the server sessions, transporting control messages of different content types on different respective channels that logically divide the control messages by content type.

2. The method of claim 1, wherein each of the client network nodes is assigned a respective unique station identifier; and
   further comprising, by the server network node, transmitting to each of the client network nodes connected to the server application the respective unique station identifiers that are assigned to the other client network nodes.

3. The method of claim 2, further comprising by the server network node,
   for each of the client network nodes,
   determining a respective station definition comprising the respective station identifier and one or more entries each of which comprises a respective connectionless transport protocol address and a respective protocol port identifier for a protocol port on the client network node; and
   the transmitting comprises sending the respective station definition to each of the other client network nodes connected to the server application.

4. The method of claim 3, wherein for each of the client network nodes
   the determining of the respective station definition comprises, by the server network node, extracting a respective network address and a respective protocol port identifier for a protocol port on the client network node from each of one or more message received from the client network node.

5. The method of claim 3, further comprising by the server network node,
   for each of the determined pairs of client network nodes, generating the respective session definition to comprise (i) the respective station identifiers assigned to the constituent client network nodes of the pair, and (ii) a transport identifier associated with a connectionless transport protocol for establishing the network connection between the constituent client network nodes of the pair.

6. The method of claim 5, further comprising by the server network node,
   for each of the determined pairs of client network nodes, generating the respective session definition to comprise an encryption identifier associated with an encryption process for encrypting data transported on the network connection between the constituent client network nodes of the pair.

7. The method of claim 1, further comprising by the server network node,
   transmitting a station definition of a proxy server to each of the client network nodes connected to the server application, wherein the station definition comprises the respective station identifier assigned to the proxy server and one or more entries each of which comprises a respective network address and a respective protocol port identifier for a protocol port on the proxy server.

8. The method of claim 1, further comprising by the server network node,
   for each of the determined pairs of client network nodes, determining for each of the active sets of complementary sources and sinks of respective data stream content types between the constituent client network nodes of the pair a definition of a respective channel that logically divides data transported in the session over the network connection between the constituent client network nodes of the pair.

9. The method of claim 8, wherein each of one or more of the channel definitions comprises a respective set of one or more transport parameter values controlling transport of data on the respective channel independently of transport of data on any of the other channels.

10. The method of claim 9, wherein each of one or more of the channel definitions comprises a respective reliability transport parameter value that indicates whether data on the respective channel are to be transported by either a reliable transport protocol in accordance with which missed data packets are retransmitted or an unreliable transport protocol in accordance with which missed data packets are dropped.

11. The method of claim 9, wherein each of one or more of the channel definitions comprises a respective compressed transport parameter value that indicates whether or not data on the respective channel are required to be processed intact.

12. The method of claim 9, wherein each of one or more of the channel definitions comprises a respective ordering transport parameter value that indicates whether data on the respective channel are to be processed in order or in any order.

13. The method of claim 9, wherein each of one or more of the channel definitions comprises a respective compression identifier that specifies a respective compression process for compressing data transported on the respective channel.

14. The method of claim 8, wherein each of one or more of the channel definitions is associated with a respective unique content identifier that identifies a respective data stream content type assigned to the channel.

15. The method of claim 1, wherein each of the control messages is sent with a unique server session identifier that is assigned to the server session and a respective content identifier that identifies the content type of the control message.

16. The method of claim 1, further comprising by the server network node,
in response to receipt of a message from a given one of the client network nodes to disconnect from the server application, sending to the other ones of the client network nodes having respective sessions with the given network node respective instructions to tear down their respective sessions with the given client network node.

17. Apparatus, comprising:
a computer-readable memory storing computer-readable instructions; and
a data processor coupled to the memory, operable to execute the instructions, and based at least in part on the execution of the instructions operable to perform operations comprising
determining one or more pairs of client network nodes that are connected to a server application hosted by the server network node, wherein the constituent client network nodes of each of the pairs have one or more active sets of complementary sources and sinks of respective data stream content types; and
for each of the determined pairs of client network nodes, sending to each of the constituent client network nodes of the pair a respective session definition defining a respective peer-to-peer session over a network connection between the constituent client network nodes of the pair;
establishing a respective server session with each of the client network nodes connected to the server application; and
over each of the server sessions, transporting control messages of different content types on different respective channels that logically divide the control messages by content type.

18. At least one computer-readable memory device having computer-readable program code embodied therein, the computer-readable program code adapted to be executed by a computer to implement a method comprising:
determining one or more pairs of client network nodes that are connected to a server application hosted by the server network node, wherein the constituent client network nodes of each of the pairs have one or more active sets of complementary sources and sinks of respective data stream content types; and
for each of the determined pairs of client network nodes, sending to each of the constituent client network nodes of the pair a respective session definition defining a respective peer-to-peer session over a network connection between the constituent client network nodes of the pair;
establishing a respective server session with each of the client network nodes connected to the server application; and
over each of the server sessions, transporting control messages of different content types on different respective channels that logically divide the control messages by content type.

19. A method, comprising by a given client network node:
connecting to a server application hosted by a server network node and to which are connected one or more other client network nodes, wherein each of the given client network node and the one or more other client network nodes has one or more sources and sinks of respective data stream content types;
receiving from the server network node a respective session definition between the given client network node and a respective session partner one of the other client network nodes for each of the other client network nodes with which the given client network node has at least one active source or sink that is complementary to an active one of the one or more sources and sinks of the other client network node; and
for each of the received session definitions, establishing a respective peer-to-peer session over a respective network connection between the given client network node and the respective session partner client network node based on the session definition.

20. The method of claim 19, wherein at least one of the session definitions is associated with multiple respective addresses for negotiating respective network connections with the respective session partner client network node; and
further comprising by the given client network node
for each of the at least one session definition, attempting to establish respective network connections with the respective session partner client network node through all of the multiple respective addresses associated with the session definition.

21. The method of claim 20, further comprising by the given client network node,
for each of the session partner client network nodes with which the given client network node has successfully established multiple concurrent network connections with the other client network node, selecting one of the multiple network connections with the session partner client network node and establishing a respective session over the selected network connection with the session partner client network node.

22. The method of claim 21, further comprising by the given client network node,
for each of the session partner client network nodes with which the given client network node has successfully established multiple concurrent network connections with the other client network node, maintaining one or more of the un-selected ones of the multiple concurrent network connections with the session partner alive during the respective session established over the selected network connection.

23. The method of claim 20, further comprising by the given client network node,
receiving from the server network node a respective station definition for each of one or more of the other client network nodes connected to the server application, wherein each of the station definitions comprises a respective unique station identifier assigned to the respective other client network node and one or more entries each of which comprises a respective network address and a respective protocol port identifier for a protocol port on the respective other client network node;

wherein each of the session definitions comprises the unique station identifier that is assigned to the respective session partner client network node; and the establishing of a respective session for each of the received session definitions comprises, by the given client network node, determining the one or more entries in the station definition of the respective session partner client network node based on the station identifier in the session definition and, for each of the entries, attempting to establish a respective network connection with the respective session partner client network node through the respective network address and the respective protocol port identifier.

24. The method of claim 23, wherein each of the session definitions comprises a transport identifier associated with a connectionless transport protocol for establishing the network connection; and the establishing of a respective session for each of the received session definitions comprises, by the given client network node, attempting to establish the respective network connection with the respective session partner client network node in accordance with the connectionless transport protocol associated with the transport identifier in the respective session definition.

25. The method of claim 19, wherein each of the session definitions is associated with one or more respective addresses for negotiating a respective network connection with the respective session partner client network node; and further comprising by the given client network node, receiving from the server network node a respective address of a proxy server network node; and the establishing of a respective session for each of the received session definitions comprises, by the given client network node, attempting to establish a respective network connection with the respective session partner client network node through each of the one or more respective addresses associated with the session definition and through the respective address of the proxy server network node.

26. The method of claim 19, wherein:

each of the session definitions is associated with a respective unique station identifier assigned to each of the given client network node and the respective other client network node; and the establishing of a respective session for each of the received session definitions comprises, by the given client network node, extracting a respective source network address from each of one or more inbound messages containing the respective station identifier assigned to the respective session partner client network node, and updating a locally stored station definition indexed by the station identifier assigned to the respective session partner client network node to include each extracted source network address that is not already included in the locally stored station definition.

27. The method of claim 19, wherein:

each of the session definitions is associated with a respective unique station identifier assigned to each of the given client network node and the respective other client network node; and the establishing of a respective session for each of the received session definitions comprises, by the given client network node, sending an outbound message containing the unique station identifier assigned to the given client network node to the respective session partner client network node;

in response to receipt of an inbound message responsive to the outbound message and containing the unique station identifier assigned to the respective session partner client network node, extracting a respective source network address from the inbound message and binding the respective session partner client network node to the extracted source network address.

28. The method of claim 27, wherein:

each of the session definitions is associated with a respective unique session identifier; and the establishing of a respective session for each of the received session definitions comprises, by the given client network node, sending another outbound message containing the unique session identifier assigned to the respective session to the respective session partner client network node over a transport stream addressed to the network address to which the respective session partner client network node is bound; and in response to receipt of an inbound message responsive to the other outbound message and containing the unique session identifier assigned to the respective session, designating the transport stream as valid for transmitting data in the respective session.

29. The method of claim 19, wherein the establishing of a respective session for each of the received session definitions comprises, by the given client network node:

creating multiple network connections with the respective session partner client network node;

establishing the respective session over a selected one of the created network connections;

maintaining one or more of the un-selected ones of the created network connections alive during the established session over the selected network connection.

30. The method of claim 29, wherein the establishing of a respective session for each of the received session definitions comprises, in response to failure of a given one of the created network connections, by the given client network node attempting to re-create the given network connection with the respective session partner client network node.

31. The method of claim 19, further comprising by the given client network node, receiving from the server network node an identification of local publish channels that are publishable from the given client network node; and publishing the local publish channels on each of the established peer-to-peer sessions.

32. The method of claim 31, further comprising by the given client network node, in response to receipt of a request to subscribe to a given one of the local publish channels on a given one of the established peer-to-peer sessions, sending to the respective session partner client network node data associated with the given local publish channel.

33. The method of claim 31, further comprising by the given client network node:

determining local subscribe channels associated with one or more local software entities on the given client network node; and in response to receipt of publication of one or more remote publish channels on a given one of the established peer-to-peer sessions, sending to the respective session partner client network node a request to subscribe to each of the local subscribe channels matching a respective one of the remote publish channels.

34. The method of claim 33, further comprising by the given client network node, in response to receipt of data on the given peer-to-peer session in a respective one of the remote publish channels matching a respective one of the local subscribe channels, passing the received data to each of the local software entities associated with the matching local subscribe channel.

35. The method of claim 19, further comprising by the given client network node:

receiving from the server network node definitions of respective channels that logically divide data transported on a given one of the sessions by data stream content type; and transmitting data streams to the respective session partner client network node on the given session in respective channels according to content type of the data streams.

36. The method of claim 35, wherein each of the channel definitions comprises a respective unique content identifier that identifies a respective data stream content type assigned to the respective channel, and the transmitting comprises transmitting each of the data streams on a respective one of the channels in packets containing a respective one of the content identifiers corresponding to the content type of the data stream.

37. The method of claim 35, wherein each of the channel definitions comprises a respective set of one or more transport parameter values controlling transport of data on the respective channel independently of transport of data on any of the other channels in the given session.

38. The method of claim 36, wherein each of the channel definitions comprises a respective reliability transport parameter value that indicates whether data on the respective channel are to be transported by either a reliable transport protocol in accordance with which missed data packets are retransmitted or an unreliable transport protocol in accordance with which missed data packets are dropped.

39. The method of claim 38, wherein the transmitting comprises by the given client network node, for each of the channels in the given session that is defined by a reliability transport value indicating that data are to be transported on the channel by the reliable transport protocol:

transmitting data packets on the channel; and re-transmitting on the channel respective ones of the transmitted data packets in response to a determination that a count of the transmitted data packets whose receipt has not been acknowledged by the session partner client network node exceeds a window threshold specified by the session partner client network node.

40. The method of claim 39, wherein the transmitting comprises by the given client network node, for each of the channels in the given session that is defined by a reliability transport value indicating that data are to be transported on the channel by the reliable transport protocol:

retaining data packets transmitted on the channel; and releasing retained data packets in response to receipt of acknowledgement that corresponding ones of the transmitted data packets have been received by the session partner client network node.

41. The method of claim 35, further comprising by the given client network node:

receiving from the respective session partner client network node a session maintenance message comprising a send window size number and a receive window size number;

transmitting data packets to the respective session partner client network node up to the send window size number of transmitted data packets whose receipt has not been acknowledged by the session partner client network node; and sending to the respective session partner client network node a respective session maintenance message responsive to receipt of at least the receive window size number of data packets from the session partner client network node since a preceding session maintenance message was sent to the session partner client network node.

42. The method of claim 41, wherein the respective session maintenance message sent by the given client network node comprises, for each of the channels that is in an active state, a respective indication of a maximum packet sequence number of the packets received on the channel.

43. The method of claim 41, further comprising receiving from the respective session partner client network node a sequence of data packets each comprising a respective sequential channel-level packet number and a respective unique session-level packet identifier, and the sending comprises incorporating into the respective session maintenance message sent to the respective session partner client network node: for each of the channels, a respective value corresponding to a highest one of the sequential packet numbers of the data packets processed by the given client network node in the channel; and the respective unique packet identifier of a most recent one of the data packets processed by the given client network node across all of the channels in the given session.

44. The method of claim 41, wherein the respective session maintenance message sent by the given client network node comprises, for each of the channels that is in an active state, a respective identification of missing packets not received on the channel.

45. The method of claim 19, further comprising by the given client network node:

receiving from the respective session partner client network node a session maintenance message comprising a first time parameter value and a second time parameter value;

in response to a determination that the given session is in an active state, transmitting packet receipt acknowledgement session maintenance messages to the session partner client network node with a maximum interval set by the first time parameter value; and in response to a determination that the given session is in an idle state, transmitting packet receipt acknowledgement session maintenance messages to the session partner client network node with a maximum interval set by the second time parameter value.

46. The method of claim 45, further comprising by the client network node:

determining that the given session is in an active state in response to a determination that at least one data packet has been received from the session partner client network node before two consecutive session maintenance messages are transmitted by the given client network node to the session partner client network node; and determining that the given session is in an idle state in response to a determination that no data packets have been received from the session partner client network node before two consecutive session maintenance messages are transmitted by the given client network node to the session partner client network node.

47. Apparatus, comprising:
- a computer-readable memory storing computer-readable instructions; and
- a data processor coupled to the memory, operable to execute the instructions, and based at least in part on the execution of the instructions operable to perform operations comprising
- connecting to a server application hosted by a server network node and to which are connected one or more other client network nodes, wherein each of the given client network node and the one or more other client network nodes has one or more sources and sinks of respective data stream content types;
- receiving from the server network node a respective session definition between the given client network node and a respective session partner one of the other client network nodes for each of the other client network nodes with which the given client network node has at least one active source or sink that is complementary to an active one of the one or more sources and sinks of the other client network node; and
- for each of the received session definitions, establishing a respective peer-to-peer session over a respective network connection between the given client network node and the respective session partner client network node based on the session definition.

48. At least one computer-readable memory device having computer-readable program code embodied therein, the computer-readable program code adapted to be executed by a computer to implement a method comprising:
- connecting to a server application hosted by a server network node and to which are connected one or more other client network nodes, wherein each of the given client network node and the one or more other client network nodes has one or more sources and sinks of respective data stream content types;
- receiving from the server network node a respective session definition between the given client network node and a respective session partner one of the other client network nodes for each of the other client network nodes with which the given client network node has at least one active source or sink that is complementary to an active one of the one or more sources and sinks of the other client network node; and
- for each of the received session definitions, establishing a respective peer-to-peer session over a respective network connection between the given client network node and the respective session partner client network node based on the session definition.

49. A method, comprising by a given client network node
- from a server network node, receiving a session definition defining a respective peer-to-peer session over a network connection between the given client network node and a session partner client network node, wherein the session definition comprises a unique station identifier assigned to the given client network node and a unique station identifier assigned to the session partner client network node; and
- based on the session definition, establishing a network connection with the session partner client network node, wherein the establishing comprises
  - sending to the session partner client network node an outbound message containing the unique station identifier assigned to the given client network node, and
  - in response to receipt of an inbound message responsive to the outbound message and containing the unique station identifier assigned to the session partner client network node, extracting a source network address from the inbound message and binding the session partner client network node to the extracted source network address.

50. A method, comprising by a given client network node:
- establishing a network connection with a session partner client network node, wherein the establishing comprises
  - sending an outbound message containing a unique station identifier assigned to the given client network node to the session partner client network node, and
  - in response to receipt of an inbound message responsive to the outbound message and containing a unique station identifier assigned to the session partner client network node, extracting a source network address from the inbound message and binding the session partner client network node to the extracted source network address;
- sending another outbound message containing a unique session identifier assigned to the session to the session partner client network node over a transport stream addressed to the network address to which the respective session partner client network node is bound; and
- in response to receipt of an inbound message responsive to the other outbound message and containing the unique session identifier assigned to the respective session, designating the transport stream as valid for transmitting data in the respective session.

\* \* \* \* \*